United States Patent
Hill

(10) Patent No.: US 7,020,658 B1
(45) Date of Patent: Mar. 28, 2006

(54) DATA FILE MANAGEMENT SYSTEM AND METHOD FOR BROWSERS

(75) Inventor: Charles E. Hill, Ansonia, OH (US)

(73) Assignee: Charles E. Hill & Associates, Marshall, TX (US)

( * ) Notice: Subject to any disclaimer, the term of this patent is extended or adjusted under 35 U.S.C. 154(b) by 436 days.

(21) Appl. No.: 09/873,539

(22) Filed: Jun. 4, 2001

Related U.S. Application Data

(60) Provisional application No. 60/209,052, filed on Jun. 2, 2000.

(51) Int. Cl.
*G06F 17/00* (2006.01)

(52) U.S. Cl. ............ 707/102; 707/101; 707/104.1

(58) Field of Classification Search ............ 707/1, 707/200, 5, 6, 10, 4, 7, 104.1; 705/10; 709/206; 715/501.1; 713/200
See application file for complete search history.

(56) References Cited

U.S. PATENT DOCUMENTS

| | | | |
|---|---|---|---|
| 4,510,567 A * | 4/1985 | Chang et al. .......... | 707/7 |
| 5,893,920 A | 4/1999 | Shaheen et al. | |
| 5,899,988 A * | 5/1999 | Depledge et al. ........ | 707/3 |
| 5,991,878 A * | 11/1999 | McDonough et al. ...... | 713/200 |
| 6,026,413 A | 2/2000 | Challenger et al. | |
| 6,085,239 A | 7/2000 | Kubo et al. | |
| 6,154,767 A | 11/2000 | Altschuler et al. | |
| 6,157,930 A | 12/2000 | Ballard et al. | |
| 6,163,773 A | 12/2000 | Kishi | |
| 6,169,986 B1 * | 1/2001 | Bowman et al. ............ | 707/5 |
| 6,185,608 B1 | 2/2001 | Hon et al. | |
| 6,195,622 B1 | 2/2001 | Altschuler et al. | |
| 6,216,212 B1 | 4/2001 | Challenger et al. | |
| 6,286,138 B1 * | 9/2001 | Purcell .................. | 717/143 |
| 6,330,566 B1 * | 12/2001 | Durham ............... | 707/104.1 |
| 6,449,636 B1 * | 9/2002 | Kredo et al. ............ | 709/206 |
| 6,631,496 B1 * | 10/2003 | Li et al. ................ | 715/501.1 |

OTHER PUBLICATIONS

Unknown Author, "Cache and Cookie Washer (for IE) 3.0," http://www.davecentral.com/5734.html, May 18, 2001.
Unknown Author, "Cache & Cookie Washer for Internet Explorer (Trial Version) Help File," http://www.webroot.com, May 21, 2001.
Unknown Author, "Awards for Cache & Cookie Washer," http://www.webroot.com/washie.htm, May 18, 2001.
Unknown Author, "4DiskClean Gold 2.50," http://www.davecentral.com/9749.html, May 18, 2001.
Unknown Author, "Cache Meister 1.0," http://www.davecentral.com/1435.html, May 18, 2001.
Lee, Keunwoo, "Konqueror and cookie," (Mar. 2001, pp. 1-7).
Hillail, Eyhab, "MSIE Cache & Cookie Manager," http://members.nbci.com/_XMCM/_the_wizard/index.htm, May 18, 2001.

(Continued)

*Primary Examiner*—Safet Metjahic
*Assistant Examiner*—Sana Al-Hashemi
(74) *Attorney, Agent, or Firm*—Baker & Daniels LLP

(57) ABSTRACT

A data file management system for web browsers includes a program configured to search data files upon an activation of an event.

54 Claims, 22 Drawing Sheets

| Files Associated With Favorite "Widgets From Domain1.com" | | | | | | |
|---|---|---|---|---|---|---|
| Name | Internet Address | Size | Expires | Last Modified | Last Accessed | Last Checked |
| image1.jpg | http://domain1.com/page1/image1.jpg | 5 KB | None | 6/1/00 7:20AM | 6/1/00 8:00AM | 6/1/00 8:00AM |
| image2.jpg | http://domain1.com/page2/image2.jpg | 5 KB | None | 6/1/00 7:20AM | 6/1/00 8:00AM | 6/1/00 8:00AM |
| Cookie: User@domain1.com | Cookie: User@domain1.com/ | 1KB | 9/3/01 12:00 AM | 6/1/00 7:20AM | 6/1/00 8:00AM | 6/1/00 8:00AM |
| index.html | http://domain1.com/index | 11 KB | 9/30/00 12:00 AM | 6/1/00 7:20AM | 6/1/00 8:00AM | 6/1/00 8:00AM |
| widget.asp | http://domain1.com/wideget.asp | 4 KB | None | None | 6/1/00 8:00AM | 6/1/00 8:00AM |
| widget.bmp | http://domain1.com/wideget.bmp | 27 KB | 9/30/00 12:00 AM | 6/1/00 7:20AM | 6/1/00 8:00AM | 6/1/00 8:00AM |

| Files Associated With Favorite "Widgets From Domain1.com" | | | | |
|---|---|---|---|---|
| Name | Internet Address | Last Accessed | Delete? | |
| image1.jpg | http://domain1.com/page1/image1.jpg | 6/1/00 8:00AM | ☐ | 1510 / 1520 |
| image2.jpg | http://domain1.com/page2/image2.jpg | 6/1/00 8:00AM | ☐ | 1530 |
| Cookie: User@domain1.com | Cookie: User@domain1.com/ | 6/1/00 8:00AM | ☐ | 1540 |
| index.html | http://domain1.com/index | 6/1/00 8:00AM | ☐ | 1550 |
| widget.asp | http://domain1.com/wideget.asp | 6/1/00 8:00AM | ☐ | 1560 |
| widget.bmp | http://domain1.com/wideget.bmp | 6/1/00 8:00AM | ☐ | 1570 |

OTHER PUBLICATIONS

Unknown Author, "4DiskClean Gold—System Optimizer, Disk & Cache cleaner," http://members.nbci.com/_XMCM/portoarss/4dc.HTM, May 18, 2001.

Unknown Author, "About My Cache 1.21e," http://www.davecentral.com/4201.html, May 18, 2001.

Crevola, Francois, "About My Cache," http://www.crevola.com/about/, May 18, 2001.

Unknown Author, "Amnesia Cache & Cookie Manager 2.0 2.0," http://www.davecentral.com/15068.html, May 18, 2001.

Unknown Author, "Amnesia Cache & Cookie Manager 3.0," http://www.consultcom.com/asp/Amnesia.asp, May 18, 2001.

Unknown Author, "BlackBoard Privacy Interface 1.8," http://www.davecentral.com/3177.html, May 18, 2001.

Unknown Author, "Browser Cache Switch BCS for Internet Explorer 5 5.2.3, " http://www.davecentral.com/10008.html, May 18, 2001.

Baudisch, Wolfgang, "Browser Cache Switch (BCS) for Internet Explorer (r), "http://ourworld.compuserve.com/homepages/w_baudisch/BCS.htm, May 18, 2001.

Unknown Author, "Amnesia Cache & Cookie Manager v3.0," May 21, 2001.

Unknown Author, "Cache and Cookie Washer for Opera 1.7, "http://www.davecentral.com/8192.html, May 18, 2001.

Unknown Author, "What's New in Cache & Cookie Washer v1.7, "http://www.webroot.com/washop.htm, May 18, 2001.

Unknown Author, "Cache Banish Pro 5.0," http://www.davecentral.com/2560.html, May 18, 2001.

Mayer, Paul, "Cache Banish 5.0," http://www.zpay.com/cache.htm, May 18, 2001.

Unknown Author, "Cache Scan 2.0, " http://www.davecentral.com/4679.html, May 18, 2001.

Unknown Author, "Cache View (Johnson) 2.1.05, " http://www.davecentral.com/6316.html, May 18, 2001.

Unknown Author, "CacheBrowser 2.0, " http://www.davecentral.com/6099.html, May 18, 2001.

Unknown Author, "Cachet 1.05," http://www.benlo.com/cachet.html, May 18, 2001.

Unknown Author, "Cachet," http://www.benlo.com/cachet.html, May 18, 2001.

Unknown Author, "CacheX for Internet Explorer 3.02, " http://www.davecentral.com/9121.html, May 18, 2001.

Wolf, Matthias, "CacheX for Internet Explorer, " http://www.mwso.com/eng/cxiell.htm, May 18, 2001.

Unknown Author, "CacheX for Netscape 3.02," http://www.davecentral.com/13552.html, May 18, 2001.

Unknown Author, "Communicator Clear 1.3," http://www.davecentral.com/4504.html, May 18, 2001.

Unknown Author, "ComClear for Windows," http://www.neuro-tech.net/comclear.xml, May 21, 2001.

Unknown Author, "Cachet," http://www.benlo.com/cachet3.html, May 21 2001.

Unknown Author, "Cache View Revision Information," http://www.progsoc.uts.edu.au/-timj/cv/revision.html, May 21, 2001.

Unknown Author, "Cover Your Tracks 3.5, " http://www.davecentral.com/2588.html, May 18, 2001.

Unknown Author, "Cover Your Tracks," http://www.ffsoftware.com/products.html, May 18, 2001.

Unknown Author, "History Inspector for Internet Explorer 4 or 5 5.0.3, " http://www.davecentral.com/7223.html, May 18, 2001.

Unknown Author, "History Inspector for Internet Explorer r 4.0 or 5, " http://ourworld.compuserve.com/homepages/w_baudisch/HistoryInspector.htm, May 18, 2001.

Unknown Author, "History Reader for Internet Explorer 5.1.0, " http://www.davecentral.com/7776.html, May 18, 2001.

Baudisch, Wolfgang, "History Reader for Internet Explorer r 4.0 or 5, " http://ourworld.compuserve.com/homepages/w_baudisch/HistoryReader.htm ∉ New. May 18, 2001.

Unknown Author, "MSIE Cache & Cookie Manager 3.04A, " http://www.davecentral.com/7623.html, May 18, 2001.

Unknown Author, "Netscape Cache Explorer 2.01," http://www.davecentral.com/819.html, May 18, 2001.

Unknown Author, "NSPatch 1.20," http://www.davecentral.com/3115.html, May 18, 2001.

Wolf, Matthias, "NSPatch—Avoid Netscape Cache Cleanup, " Http://www.mwso.com/eng/nspatch.htm, May 18, 2001.

Unknown Author, "Purge Cache, Cookies and Tracks for Internet Explorer (PurgeIE) 3.02, " http://www.davecentral.com/10510.html, May 18, 2001.

Unknown Author, "Purge Cache, Cookies and Tracks for Internet Explorer Version 4.02 supports IE-6 beta.," http://www.aandrc.com/purgeie/ May 18, 2001.

Unknown Author, "RapidCache 2.0," http://www.davecentral.com/14274.html, May 18, 2001.

Unknown Author, "rapidcache server," http://www.vicomsoft.com/rapidcache/rapidcache.main.html?track=internal, May 18, 2001.

Unknown Author, "SafeNet 2.0," http://www.davecentral.com/8531.html, May 18, 2001.

Unknown Author, "Web Cache Illuminator 3.01," http://www.davecentral.com/10294.html, May 18, 2001.

Unknown Author, "Web Cache Illuminator," http://www.nstarsolutions.com/wci.htm, May 18, 2001.

Unknown Author, "WebCache 6.20," http://www.davecentral.com/6636.html, May 18, 2001.

Zorc, Dave, "WebCache!." http://www.fsb.hr/-dzorc/webcache.html, May 18, 2001.

Unknown Author, "WinJanitor 1.0," http://www.davecentral.com/16030.html, May 18, 2001.

WinJanitor, "nattyware," http://www.nattyware.com/wj.html, May 18, 2001.

Unknown Author, "WinSysClean 2.0," http://www.davecentral.com/9513.html, May 18, 2001.

Unknown Author, "WinSysClean 2001/iNFO/ABOUT," http://www.usro.net/products/winsysclean/ May 18, 2001.

Unknown Author, "WinSysClean 2001/KEY FEATURES," http://www.usro.net/products/winsysclean/features.htm, May 21, 2001.

Unknown Author, "siegesoft," http://www.siegesoft.com/_html/product_page.asp?menuID=2&productid+7, May 18, 2001.

Unknown Author, "Awards for Cache & Cookie Washer," http://www.webroot.com/washie.htm, May 18, 2001.

Unknown Author, "Purge IE Product Information," http://www.aandrc.com/purgeie/product.htm, May 18, 2001.

* cited by examiner

| Name | Internet Address | Type | Size | Expires | Last Modified | Last Accessed | Last Checked |
|---|---|---|---|---|---|---|---|
| image1.jpg | http://domain1.com/page1/image1.jpg | JPEG | 5.0KB | None | 6/1/00 7:20AM | 6/1/00 8:00AM | 6/1/00 8:00AM |
| image2.jpg | http://domain1.com/page2/image2.jpg | JPEG | 5.0KB | None | 6/1/00 7:20AM | 6/1/00 8:00AM | 6/1/00 8:00AM |
| image3.jpg | http://domain1.com/page3/image3.jpg | JPEG | 5.0KB | None | 6/1/00 7:20AM | 6/1/00 8:00AM | 6/1/00 8:00AM |
| image4.gif | http://domain2.com/page1/image4.gif | GIF | 8.0KB | None | 6/2/00 6:00AM | 6/3/00 10:00PM | 6/3/00 10:00PM |
| image5.gif | http://domain2.com/page2/image5.gif | GIF | 8.0KB | None | 6/2/00 6:00AM | 6/3/00 10:00PM | 6/3/00 10:00PM |
| image6.gif | http://domain2.com/page3/image6.gif | GIF | 8.0KB | None | 6/2/00 6:00AM | 6/3/00 10:00PM | 6/3/00 10:00PM |
| image7.jpg | http://domain3.com/page1/image7.jpg | JPEG | 4.0KB | None | 5/31/00 8:30AM | 6/3/00 10:02PM | 6/3/00 10:02PM |
| image8.jpg | http://domain3.com/page2/image8.jpg | JPEG | 4.0KB | None | 5/31/00 8:30AM | 6/3/00 10:02PM | 6/3/00 10:02PM |
| products.html | http://products.com/page1/products.html | HTML | 31.5KB | None | None | 6/3/00 10:11PM | 6/3/00 10:11PM |

FIG. 1

| Search: Name= !widget! or !cookie! AND Address = !domain1! AND Type = (Cookie or JPEG) AND Last Accessed >= 6/1/00 AND Site Freq >10/M ||||| 
|---|---|---|---|---|
| Name: !widget! or !cookie! | Internet Address: !domain1! | Type: Cookie or JPEG | Last Accessed: >= 6/1/00 | Site Freq: >10/Month |
| widget1104.jpg | http://domain1.com/wideget.1104.jpg | JPEG | 9/30/00 12:00AM | 17 |
| Cookie: User@domain1.com | Cookie: User@domain1.com | Cookie | 6/1/00 7:20AM | 22 |

FIG. 2C

| Search: "!domain1! AND !widget!" ||||||| 
|---|---|---|---|---|---|---|
| Name | Internet Address | Size | Expires | Last Modified | Last Accessed | Last Checked |
| widget.asp | http://domain1.com/wideget.asp | 4KB | None | None | 6/1/00 8:00AM | 6/1/00 8:00AM |
| widget.bmp | http://domain1.com/wideget.bmp | 27 KB | 9/30/00 12:00 AM | 6/1/00 7:20AM | 6/1/00 8:00AM | 6/1/00 8:00AM |

FIG. 2E

| Search: "!domain1! AND Last Modified = 6/1/00" | | | | | | |
|---|---|---|---|---|---|---|
| Name | Internet Address | Size | Expires | Last Modified | Last Accessed | Last Checked |
| image1.jpg | http://domain1.com/page1/image1.jpg | 5 KB | None | 6/1/00 7:20AM | 6/1/00 8:00AM | 6/1/00 8:00AM |
| image2.jpg | http://domain1.com/page2/image2.jpg | 5 KB | None | 6/1/00 7:20AM | 6/1/00 8:00AM | 6/1/00 8:00AM |
| Cookie: User@domain1.com | Cookie: User@domain1.com/ | 1KB | 9/3/01 12:00 AM | 6/1/00 7:20AM | 6/1/00 8:00AM | 6/1/00 8:00AM |
| index.html | http://domain1.com/index | 11 KB | 9/30/00 12:00 AM | 6/1/00 7:20AM | 6/1/00 8:00AM | 6/1/00 8:00AM |
| widget.bmp | http://domain1.com/wideget.bmp | 27 KB | 9/30/00 12:00 AM | 6/1/00 7:20AM | 6/1/00 8:00AM | 6/1/00 8:00AM |

FIG. 2D

| Search: "TYPE = cookie AND Last Accessed = 6/1/00" | | | | | | |
|---|---|---|---|---|---|---|
| Name | Internet Address | Size | Expires | Last Modified | Last Accessed | Last Checked |
| Cookie: User@domain2.com | Cookie: User@domain2.com/ | 1 KB | 10/3/01 12:00 AM | 6/1/00 9:00AM | 6/1/00 9:00AM | 6/1/00 9:00AM |
| Cookie: User@domain3.com | Cookie: User@domain3.com/ | 1 KB | 12/12/01 12:00 AM | 6/1/00 7:35AM | 6/1/00 8:04AM | 6/1/00 8:04AM |
| Cookie: User@domain1.com | Cookie: User@domain1.com/ | 1KB | 9/3/01 12:00 AM | 6/1/00 7:20AM | 6/1/00 8:00AM | 6/1/00 8:00AM |

FIG. 2F

| Files Associated With Favorite "Widgets From Domain1.com" | | | | | | |
|---|---|---|---|---|---|---|
| Name | Internet Address | Size | Expires | Last Modified | Last Accessed | Last Checked |
| image1.jpg | http://domain1.com/page1/image1.jpg | 5 KB | None | 6/1/00 7:20AM | 6/1/00 8:00AM | 6/1/00 8:00AM |
| image2.jpg | http://domain1.com/page2/image2.jpg | 5 KB | None | 6/1/00 7:20AM | 6/1/00 8:00AM | 6/1/00 8:00AM |
| Cookie: User@domain1.com | Cookie: User@domain1.com/ | 1KB | 9/3/01 12:00 AM | 6/1/00 7:20AM | 6/1/00 8:00AM | 6/1/00 8:00AM |
| index.html | http://domain1.com/index | 11 KB | 9/30/00 12:00 AM | 6/1/00 7:20AM | 6/1/00 8:00AM | 6/1/00 8:00AM |
| widget.asp | http://domain1.com/wideget.asp | 4 KB | None | None | 6/1/00 8:00AM | 6/1/00 8:00AM |
| widget.bmp | http://domain1.com/wideget.bmp | 27 KB | 9/30/00 12:00 AM | 6/1/00 7:20AM | 6/1/00 8:00AM | 6/1/00 8:00AM |

FIG. 14

| Files Associated With Favorite "Widgets From Domain1.com" | | |
|---|---|---|
| Name | Internet Address | Last Accessed | Delete? |
| image1.jpg | http://domain1.com/page1/image1.jpg | 6/1/00 8:00AM | ☐ |
| image2.jpg | http://domain1.com/page2/image2.jpg | 6/1/00 8:00AM | ☐ |
| Cookie: User@domain1.com | Cookie: User@domain1.com/ | 6/1/00 8:00AM | ☐ |
| index.html | http://domain1.com/index | 6/1/00 8:00AM | ☐ |
| widget.asp | http://domain1.com/wideget.asp | 6/1/00 8:00AM | ☐ |
| widget.bmp | http://domain1.com/wideget.bmp | 6/1/00 8:00AM | ☐ |

FIG. 15

DATA FILE MANAGEMENT SYSTEM AND METHOD FOR BROWSERS

This application claims benefit of U.S. Provisional Application Ser. No. 60/209,052, filed Jun. 2, 2000, the disclosure of which is incorporated herein by reference.

FIELD OF THE INVENTION

The invention relates to Internet web browsers, and, more particularly, to data file managements systems for browsers.

BACKGROUND AND SUMMARY OF THE INVENTION

A variety of available web browsers are used to access the Internet. Microsoft's Internet Explorer and Netscape's Netscape 6 are two widely used browsers. Other browsers, such as Konqueror, Opera, Mosaic, and Mozilla, enjoy wide popularity. Typically, a browser stores data files associated with Internet sites and web pages, or other network sites, such as a LAN, WAN, etc., on a user's hard drive, usually in a dedicated storage folder or directory. Such a storage folder or directory is often referred to as a cache. The data files are usually graphics files, such as .jpg and .gif files, and text files, such a .html, .txt, asp and cookie files. Usually the text files define the content of an Internet site or web page, and reference the graphics files to be included in the browser display. Each data file stored in the storage folder includes a file name and data stored within the file. Also, there is additional data stored and used by the browser's data file management system. This additional data is usually in the form of data fields indicating the Internet address, size, when the file was last modified, and when it was last accessed: Commonly used names for these data fields are "Internet Address", "Size", "Expires", "Last Modified", "Last Accessed", and "Last Checked".

Several of these fields can be used in conjunction with a "Conditional Get" command as specified in the Hypertext Transfer Protocol specification defined as "HTTP/1.1", June 1999, published by the World Wide Web Consortium, the disclosure of which is incorporated herein by reference. When a user browses the Internet, the data files for each Internet address the user accesses are automatically stored on the user's hard drive in the storage folder. The data files for an Internet address are stored and are accessed on repeated visits to that address to reduce the amount of data that must be downloaded. Illustratively, this is accomplished by the browser searching for a data file on the user's hard drive that is identified by the .html or .asp file for that address. Once found, the browser sends the "Last Modified" date and file name to the server. If the file has not been modified since the "Last Modified" date, the server need not send the file but only an acknowledgment. This significantly reduces the bandwidth requirement of the system. Similarly, the "Expires" field, which contains a date, can be check against the current date. If the current date is later than the "Expires" field, the client will request a new file from the server.

Computers have the ability to store many megabytes (MB) of browser downloaded data, thus allowing data from more addresses to be stored locally and thereby reducing bandwidth requirements and increasing server response speed for the user. As a user continues to browse various web pages, the number of data files stored on the user's hard drive increases proportionally. However, while browsing the Internet for product and/or information, the user will access data at many Internet addresses that are of no value or interest to the user. Nevertheless, the data files for each address are automatically stored on the user's hard drive regardless of value or interest. Over time the amount of data stored by the browser can become excessive and tend to slow down the response of the browser, as the browser must search through possibly tens of thousands of stored data files contained in the cache.

Illustratively, most web browsers allow a user to specify the amount of space allotted to this storage area, usually as a percentage of total hard drive space. However, as this data increases in quantity, the response of the user's computer to search and find these stored data files will decrease. Additionally, current hard drives have a capacity of at least 20 gigabytes (GB) or more. Thus, setting the allotted storage space to even a small capacity, such as 1% of the total hard drive space, results in a storage space of approximately 200 MB. Thus, over time tens of thousands of files may be stored in the drive space, resulting in decreased access time to data files stored on the computer and difficulty in searching the storage area.

Browser data file management systems attempt to compensate for this problem by allowing the user to "empty" the designated storage area on the hard disk by deleting all of these files. However, this also deletes files for addresses that the user would be expected to access in the future. Additionally, if a user desires to delete certain cookies to ensure privacy, the user cannot easily determine which cookies should be save and which cookies should be deleted, especially if the cookies do not contain descriptive names. Thus, the user is often left to "guess" as to which cookie to delete. Often, users will err on the side of caution and delete all cookies, thus deleting cookies that the user would otherwise keep. Accordingly, when the user visits a web page of interest, such as an on-line shopping page, the user must again input relevant information that would otherwise be stored in the cookie, such as mailing address, e-mail address, and other contact information.

Browser data file management systems also attempt to compensate for this storage problem by adding a least recently used ("LRU") algorithm in conjunction with the disk space limitation for the storage of the data files. The browser, through the LRU algorithm, will remove the oldest data files when the allocated hard disk space becomes full. The LRU determines which file has been least recently used by interrogating the "Last Accessed" field. By allowing the user to limit the amount of disk space allocated for the browser storage of data files to a smaller amount, the effects of handling large quantities of data files are minimized. Thus, if a user elects to specify a storage space smaller than 1% of the disk capacity, such as 5 MB, access degradation is minimized. However, the small storage space tends to becomes full soon after browsing a number of addresses, and the LRU algorithm removes those files most likely to be accessed in the future. Thus, the bandwidth requirement is no longer minimized, and access time between the client PC and server is increased.

Finally, a user may interrogate the contents of the storage area directly, searching through addresses stored therein and selectively deleting each data file not of interest to the user. However, this method is labor intensive and highly inefficient, as usually hundreds, if not thousands of data files are often stored in the cache.

In addition to deleting selected files, a user may desire to interrogate the contents of the stored data files. Illustratively, a user may want to ascertain all stored data files associated with a particular Internet address. One method currently available to the user is to selectively sort the contents of the stored data files by the Internet address, and thereafter scroll to the particular Internet address of an associated data file to examine related files. However, this method is time consuming and does not often list all associated data files together, e.g. the cookie file associated with a particular Internet address will be listed separate and apart from other files associated with that same Internet address, as the cookie file name often begins with "Cookie:". Thus, the user experiences difficulty in ascertaining the full set of data files associated with a particular Internet address.

SUMMARY OF THE INVENTION

According to the invention, a system for managing a plurality of data files for web browsers is provided. The system includes a storage area on a computer storage medium, the storage area storing the data files; a computer configured to access the storage area; a first database configured to index the data files stored in the storage area; and a program configured to generate automated search strings, the program further configured to search the database index according to the automated search stings and identify data files associated with the automated search strings.

According to the invention, a system for managing a plurality of data files for web browsers is provided. The system includes a storage area on a computer storage medium, the storage area storing the data files; a computer configured to access the storage area; a first database configured to index the data files stored in the storage area; and a program configured to generate automated search strings, the program further configured to search the database index according to the automated search strings and identify data files associated with the automated search strings.

Also according to the invention, a method for managing a plurality of data files stored in a storage area for a web browser is provided. The method comprising the steps of indexing the stored data files in a database to provide a database index; generating automated search strings based on the stored data files in the storage area; searching the database according to the automated search strings; and identifying data files associated with the search strings.

Another system according to the invention comprises a computer storage medium; a computer configured to access the storage medium; a first list of network addresses stored on the computer storage medium; a storage area on a computer storage medium, the storage area storing the data files; and a program executable on the computer, the program configured to identify data files associated with the first list of network addresses and delete data files not associated with the first list of network addresses.

Another system according to the invention includes a computer storage medium; a computer configured to access the storage medium; a list of network addresses stored on the computer storage medium; a storage area on the computer storage medium, the storage area storing the data files; and a program executable on the computer, the program configured to determine an access frequency associated with one of the data files and modify the list of network addresses based on the access frequency of the data file.

Also according to the invention, a system for managing a plurality of data files for a web browser includes a storage area on a computer storage medium, the storage area storing the data files; a computer configured to access the storage area; and a program executable on the computer, the program configured to determine an access time associated with the computer accessing storage area, and further configured to delete data files in the storage area if the access time exceeds a threshold value.

Also according to the invention, a method for managing a plurality of data files stored in a storage area for web browsers is disclosed. The method comprises the steps of indexing the stored data files in a database; storing user-defined search strings in a database; generating automated search strings based on the stored data files in the storage area; storing the automated search stings in the database; searching the database index according to the user-defined search strings and automated search stings; and identifying data files associated with the search strings.

Another method in accordance with the present invention includes the steps of inputting a search string, searching a data field in a storage area, associating data files in the storage area with the data field, and deleting the data files associated with the data field having the search string.

Another method according to the present invention includes the steps of searching a data field in a storage area, establishing a common address in the data field, and associating data files with the common address.

Another method according to the present invention includes the steps of indexing data files in a storage area, and indexing network addresses associated with the data files in the storage area to increase access speed to the information in the data files.

Additional features of the invention will become apparent to those skilled in the art upon consideration of the following detailed description of the illustrated embodiment exemplifying the best mode of carrying out the invention as presently perceived.

BRIEF DESCRIPTION OF THE DRAWINGS

The detailed description particularly refers to the accompanying figures in which:

FIG. 1 is a storage directory listing of data files associated with web pages stored in a storage directory, the directory listing showing data fields associated with the data files;

FIG. 2C depicts an illustrative result of the structured query search string;

FIG. 2D depicts another illustrative result of a structured query search string;

FIG. 2E depicts yet another illustrative result of a structured query search string;

FIG. 2F depicts still another illustrative result of a structured query search string;

FIG. 14 is an illustrative user interface in which is displayed stored data files associated with a Favorite Internet site;

FIG. 15 is an illustrative user interface in which is displayed stored data files associated with a Favorite Internet site, and which provides the user the option to selectively delete data files based on the Last Accessed date.

DETAILED DESCRIPTION OF THE DRAWINGS

Figure 2A:
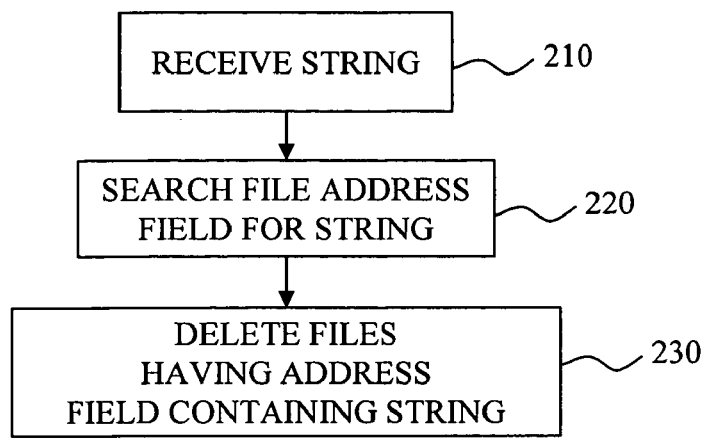
FIG. 2A is a flow diagram illustrating automatic removal of files a user has indicated to be removed by using a search string for an address field.

The data file management system and method of the present invention allows a user to save those data files that the user has the most interest in while deleting those data files that were stored as a result of accessing an incorrect network address, or an network address of no current interest to the user, or and network address which is no longer of interest to the user. Furthermore, the system can be selectively configured to automatically delete data files no longer of interest to the user, or automatically delete certain data files specified by the user. Further still, the system allows a user to selectively interrogate all stored data files associated with a search string, or a particular data file, or a particular network site. Additionally, the system can be configured to automatically delete data files stored during a browsing session, or delete a selected subset of data files stored during a browsing session.

A user commonly accesses a network, such as the Internet, via a personal computer connected to an Internet service provider (ISP). The personal computer includes a memory storage area, such as a hard disk, associated random access memory (RAM), and a web browsing program. The user launches the web browsing program to begin a browsing session, accesses various network sites during the browsing session, and exits the web browsing program to terminate the browsing session.

As shown in FIG. 1, a storage directory in which data files are stored has a listing 1 which illustratively includes data fields Name 10, Internet Address 20, Size 30, Expires 40, Last Modified 50, Last Accessed 60, Last Checked 70, and Type 80. Illustratively, these are generic terms in database fields for files stored by a web browser, such as Microsoft Internet Explorer. These fields include:

Name: This field is the name of the file that is stored on the client computer.

Internet Address: This is the Uniform Resource Locator (URL) that allows the browser on the client computer to locate the file on the web server.

Size: This lists the size of the file, typically in kilobytes (kb).

Expires: This is an optional field that allows the designer to place a date or the word "none". When a date is in this field, it is compared to the current date, and if the current date is later than the date in the field, the file is automatically replaced. If "none" is in the field no action is taken. Last Modified: This is an optional field which allows the designers to place a date that corresponds with the last date on which the file was changed or modified. Alternatively, the word "none" can be used. When a date is in this field the date along with the HTTP "conditional GET" command is sent to the server. The server compares the date to its "last modified" date of the file to determine if its version is newer than the one stored on the client's computer. If its version is newer, the newest version is downloaded to the client computer. If the version on the client's computer and that on the server are the same, the client computer uses the file stored on the client computer. If the word "None" is in this field, the file is always downloaded without a version test.

Last Accessed: This is an optional field that is used by the browser on the client computer to enter the last date this file was accessed by the browser. This is used by the browser's LRU to determine which files to remove when additional storage space is required.

Last Checked: This is an optional field that is used by the browser on the client computer to enter the last date this file was checked to determine if it has expired or has been modified. This is used by the browser's LRU to determine which files to remove when additional storage space is required.

Type: The type of data file, e.g. a text file, an HTML document, a cookie, etc.

Illustratively, a listing 1 includes data files from four Internet domain addresses—domain 1.com, domain2.com, domain3.com and products.com. From these four Internet domain addresses, nine separate Internet address 21–29 are shown, representing the nine Internet addresses or files the user has accessed through a browser. Of course, one skilled in the art will appreciate that FIG. 1 shows only a partial listing of many thousands of data files stored in a cache storage area on the user's computer, as it is common to have many thousands of data files stored in a storage directory associated with a browser.

After searching through various web pages, a user may determine that the only Internet address containing information of interest is in products.com, Internet address 29. As shown in FIG. 2A, the present invention allows the user to efficiently and automatically delete numerous data files in the storage directory without inadvertently deleting data files associated with Internet address 29. In step 210, the user uses an input device to enter a sequence of characters or string indicative of data files the user wants to remove from the storage directory. Illustratively, the user would enter "domain1" to select all data files associated with domain1.com, i.e., Internet addresses 21–23.

The user's computer then searches the data field 20 for the string, as illustrated in step 220. When the Internet addresses containing this string are found in data field 20, the user's computer automatically deletes the associated data files, as shown in step 230. Illustratively, the search string "domain1" would result in data files image1.jpg, image2.jpg, and image3.jpg being deleted. One skilled in the art will note that an alternative embodiment includes entering a string indicative of data files the user wants to save in the storage directory, and deleting all files not associated with this string. Thus, in the alternative embodiment just described, the user would enter the string "products.com", and all files not associated with the string "products.com" would be deleted.

Figure 3A:
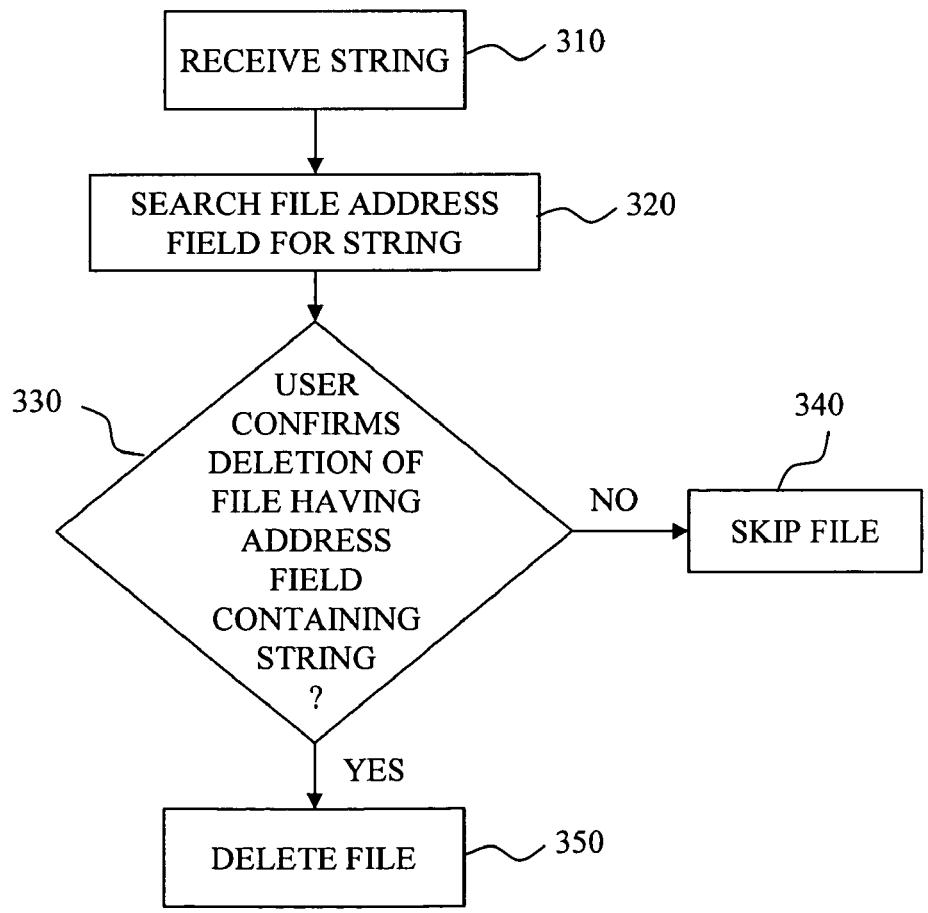
FIG. 3A is a flow diagram illustrating removal of files a user has indicated to be removed by using a search string for an address field, including a step in which the user must confirm deletion of the files.

Another illustrative embodiment is shown in FIG. 3A. In step 310, the user enters a string indicative of data files the user wants to remove from the storage directory. In step 320, the user's computer searches data field 20 for this string. When the Internet addresses containing this string are found, the user's computer prompts the user to confirm deletion of a data file having an addresses containing the string, as shown in step 330. If the user determines not to delete the data file, step 340 skips that data file. If the user determines to delete the data file, step 350 deletes the data file from the storage area.

Figure 4:
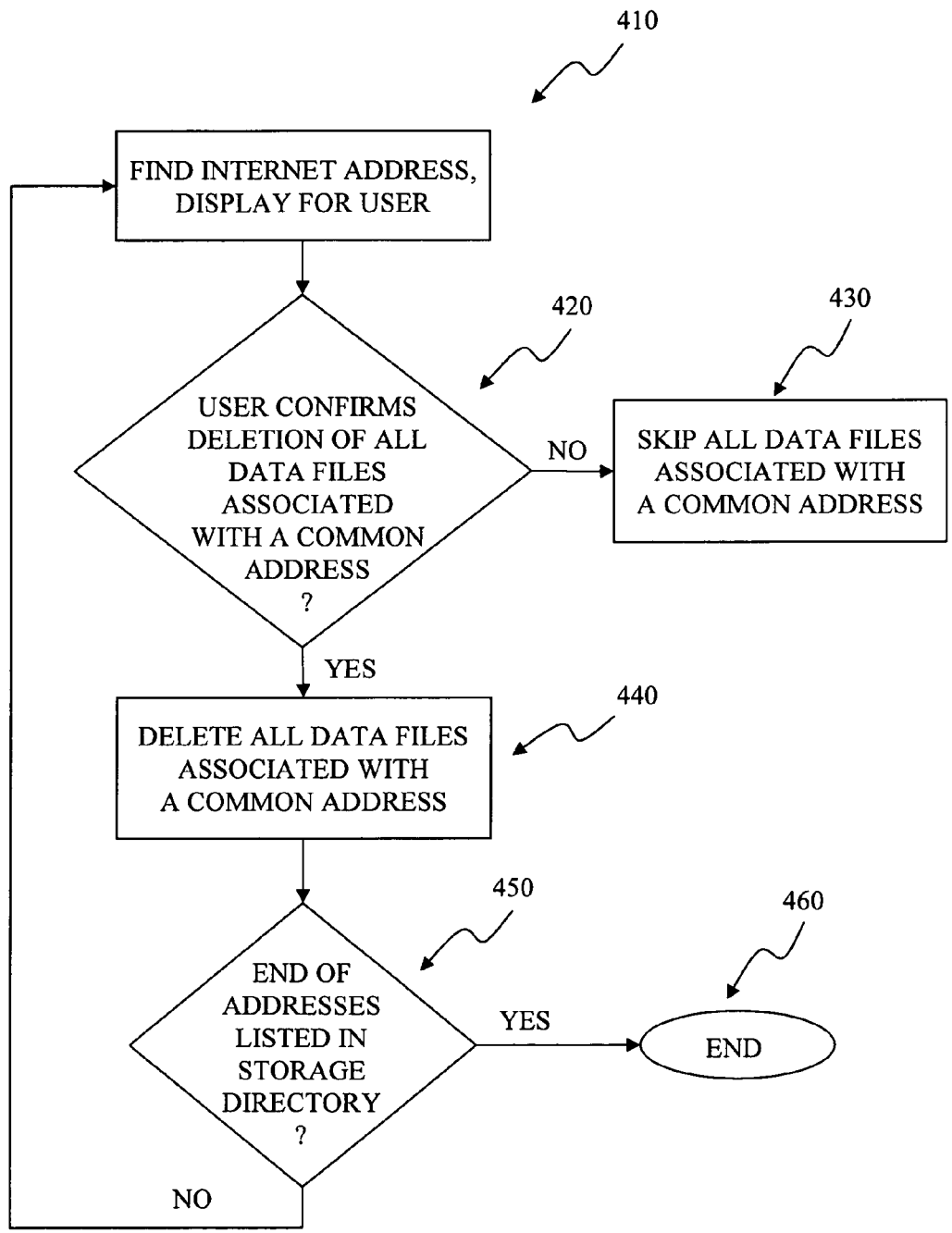
FIG. 4 is a flow diagram illustrating sequential display of Internet addresses and the removal of all data files associated with the Internet address.

Yet another illustrative embodiment is shown in FIG. 4. In step 410, the data file management function searches the storage area for common Internet addresses. Illustratively, step 410 associates all data files common to domain1.com, domain2.com, domain3.com and products.com. Thus, data files associated with Internet addresses 21–23 are associated with domain1.com, data files associated with Internet addresses 24–26 are associated with domain2.com, data files associated with Internet addresses 27 and 28 are associated with domain3.com, and the data file associated with Internet address 29 is associated with products.com. In step 420, the user's computer prompts the user to confirm deletion of all data files associated with a common address. If the user determines not to delete the data files associated with a common address, step 430 skips the data files. If the user determines to delete the data files associated with a common address, the computer deletes the data files from the storage area, as shown in step 440. In step 450, the computer then determines whether all addresses have been interrogated. If no other addresses remain, step 460 exits the routine. If there are addresses remaining, the process is repeated beginning with the next common address. Illustratively, deletion of all data files associated with domain1 would result in deleting data files image1.jpg, image2.jpg, and image3.jpg.

Figure 2B:
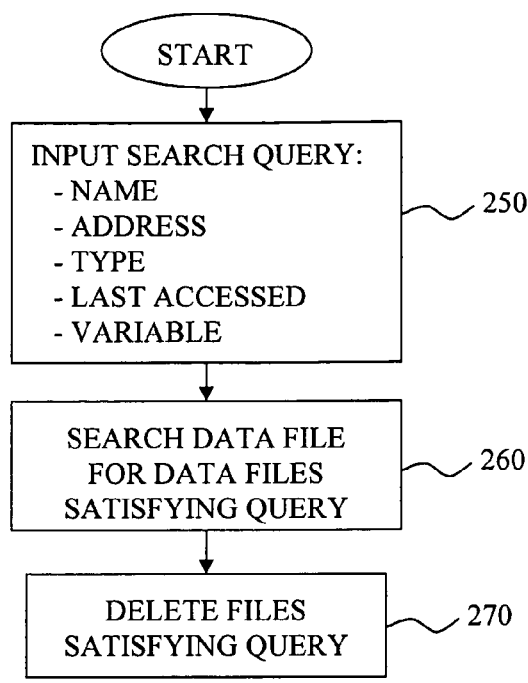
FIG. 2B is a flow diagram illustrating automatic removal of files a user has indicated to be removed by using a search string in the form of a structured query.
Figure 3B:
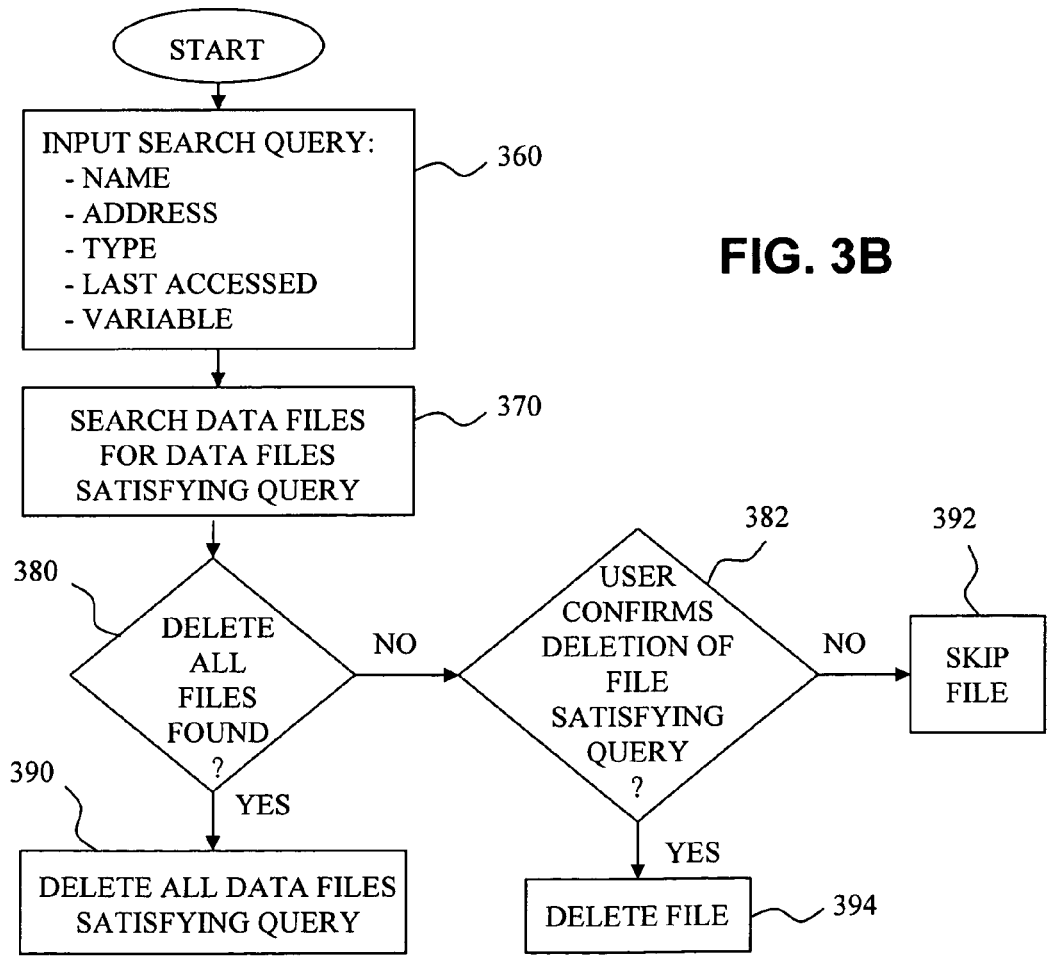
FIG. 3B is a flow diagram illustrating removal of files a user has indicated to be removed by using a search string in the form of a structured query, including steps to delete all files satisfying the query or selectively delete each file.

Of course, one of ordinary skill in the art will readily appreciate that common searching techniques know in the art can be employed in the present invention, such as using root expanders and boolean variables. FIGS. 2B and 3B illustrate an alternative embodiment of the invention in which a boolean structured search is used to search the stored data files. The search string is a structured query that comprises the following variables: Name, Address, Type, Last Accessed, Last Modified, Last Checked, Expires, and a variable field. The Name and Address fields are text fields, the Type field comprises a list of predefined file types, and the Last Accessed, Last Modified, Last Checked, and Expires fields are date fields. The Variable field is a user defined field.

Of course, one of ordinary skill in the art will readily appreciate that common searching techniques known in the art can be employed in the present invention, such as using root expanders and boolean variables. FIGS. 2B and 3B illustrate an alternative embodiment of the invention in which a boolean structured search is used to search the stored data files. The search string is a structured query that comprises the following variables: Name, Address, Type, Last Accessed, Last Modified, Last Checked, Expires, and a variable field. The Name and Address fields are text fields, the Type field comprises a list of predefined file types, and the Last Accessed, Last Modified, Last Checked, and Expires fields are date fields. The Variable field is a user defined field.

The current session database 1610 tracks all Internet sites and associated data files accessed during the current browsing session. Thus, from the time a user launches a web browser and begins accessing Internet sites, a database of all data files accessed during that session is created. The current session database 1610 fields are the Name, Address, Type, Last Accessed, Last Modified, Last Checked, Expires and Delete fields.

The search string database 1620 stores all user-defined and automatically generated search strings. Often a user will conduct a repetitive search after each browsing session. Accordingly, when a user enters a search string, the user has the option to save the search string in the search string database 1620. Thus, the user will not have to receptively enter the same search string.

The Favorite database 1630 tracks all Internet sites and associated data files corresponding to a user's favorite list. A favorite list is a list generated by the user for "favorite" Internet sites, i.e., Internet sites that the user often visits. However, the term "Favorite" is not used in the subjective sense; rather, a favorite list merely allows a user to select a frequently accessed Internet site quickly and conveniently, e.g., from a pull-down menu, rather than by manually entering the Internet address. The Favorite database 1630 fields are the Name, Address, Type, Last Accessed, Last Modified, Last Checked, and Expires fields.

The preferred database 1640 tracks all Internet sites and associated data files corresponding to a user's preferred list. A preferred list is a list of "preferred" Internet sites that is not in the user's Favorite list. For example, a user may access an on-line movie review Internet site infrequently, perhaps on a monthly basis. The user may not desire to add the Internet site to the Favorite list for several reasons. First, adding infrequently visited Internet sites to the Favorite list will create a very large favorite list over time, and thus it will be difficult for the user to quickly find the Internet site among the large list. Additionally, the user may not want the Internet site listed in the event that another person uses the user's computer.

The utility database 1650 stores user preference settings for the data file management system.

The frequency database 1660 is a database that tracks the frequency a user accesses a particular Internet site during all browsing sessions. Illustratively, the frequency database 1660 comprises a list of Internet sites accessed, the date the Internet site was first accessed, the date the Internet site was last accessed, and how many times the Internet site has been accessed. The frequency database 1660 is used to notify a user when a particular Internet site the user often accesses is not contained in either the user's Favorite database 1630 or preferred database 1640, or when a particular Internet site in either user's Favorite database 1630 or preferred database 1640 has not been accessed recently. The frequency is determined by dividing the total number of times the Internet site has been accessed by the time period between the first and last access. The frequency can be specified as number of accesses per week, number of accesses per month, etc.

The cache database 1670 stores all information regarding all data files stored in the caches. The cache database fields are the Name, Address, Type, Last Accessed, Last Modified, Last Checked, and Expires fields.

The current session database 1610, search string database 1620, favorite database 1630, preferred database 1640, utility database 1650, frequency database 1660, and cache database 1670 facilitate structured queries. FIG. 2B is a flow diagram illustrating automatic removal of files a user has indicated to be removed by use of a structured query. In step 250, the user inputs an illustrative search string containing the following search fields: Name, Address, Type, Last Accessed and Variable. FIG. 2C depicts the illustrative results of the search string with the following data fields:

Name="!widget!" or "!Cookie!"
Address="!domain1!"
Type=Cookie or JPEG
Last Accessed >=Jun. 1, 2000
Variable=Site Frequency>10/Month Of course, fewer or more data fields can be included in the search string. For example, if the user determines that the only Internet address containing information of interest is in products.com, Internet address 29, the user could enter the string "domain!" where the root expander "!" would result in the search string matching the domain1, domain2 and domain3 addresses contained in the Address field of the cache database 1670. Accordingly, data files 21–28 are be deleted by using the search string "domain!". Similarly, as described above, the user can select the string to be indicative of data files the user wants to save in the cache, and thus delete all files not associated with this string. Thus, in the alternative embodiment just described, the user would enter the string "!products!", and all files not associated with the string "!products!" would be deleted. FIGS. 2D, 2E and 2F depicts illustrative results for search strings "Name=!widget! or !cookie! AND Address=!domain1! AND Type=(Cookie or JPEG) AND Last Accessed >=Jun. 1, 2000 AND Site Freq>10/M", "!domain1! AND Last Modified=Jun. 1, 2000" and "TYPE=cookie AND Last Accessed=Jun. 1, 2000", respectively.

When the search string is not in the form of a structured query, then by default only the Name and Address fields are searched for data associated with the search string. A default root expander is appended to the search string. Thus, the string "domain 1" is by default the structured query "!domain1!", and any file with the string "domain1" occurring in its name or address field will be identified. Of course, one of ordinary skill in the art will recognize that the default condition can instead be an exact phrase. Thus, the string "domain1" can, by default, be configured to identify files only with the exact name "domain1" or address "domain1".

Figure 5:
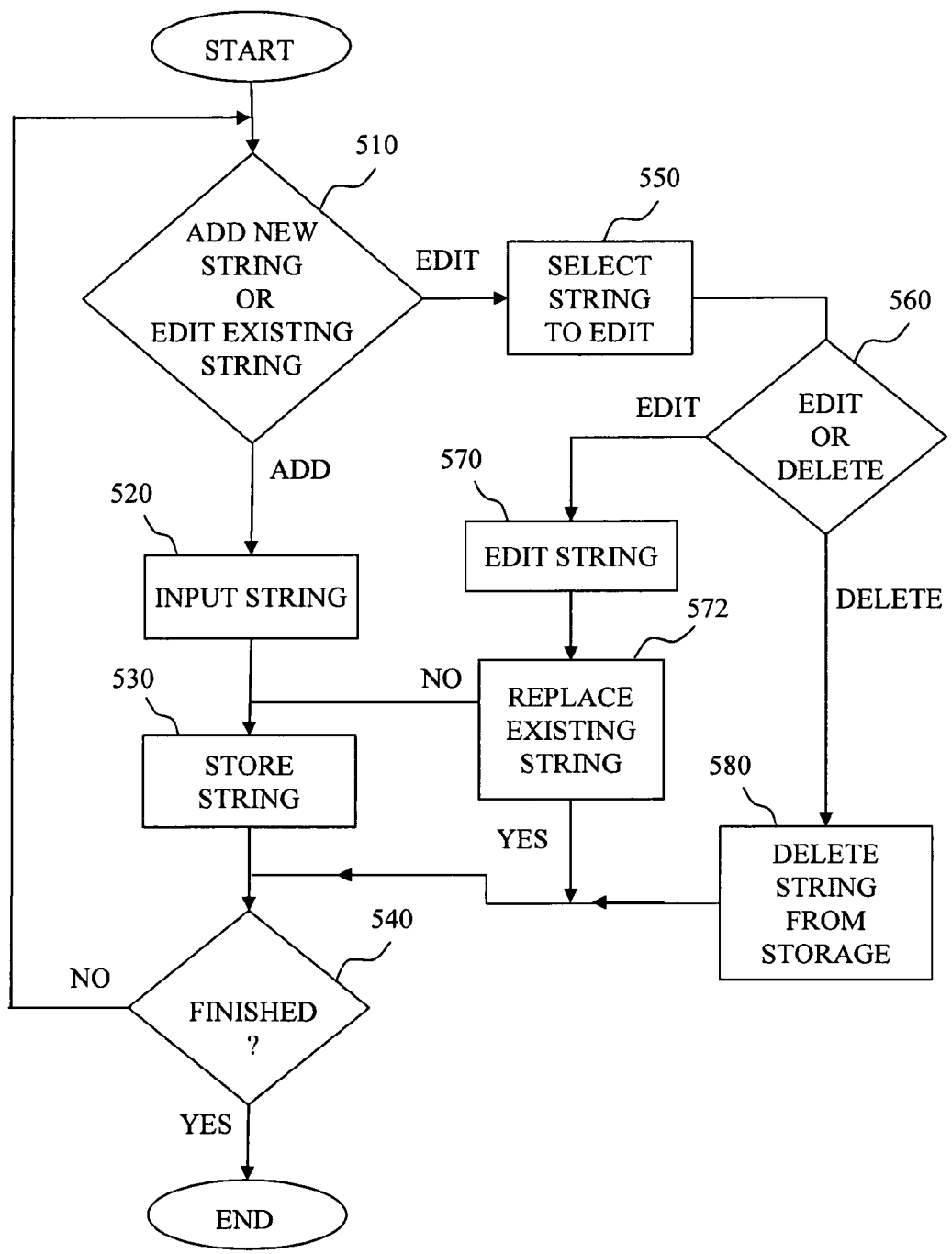
FIG. 5 is a flow diagram illustrating the process of inputting search strings into a database used to store search strings for use in conjunction with a utility to automatically manage the data files.
Figure 10A:
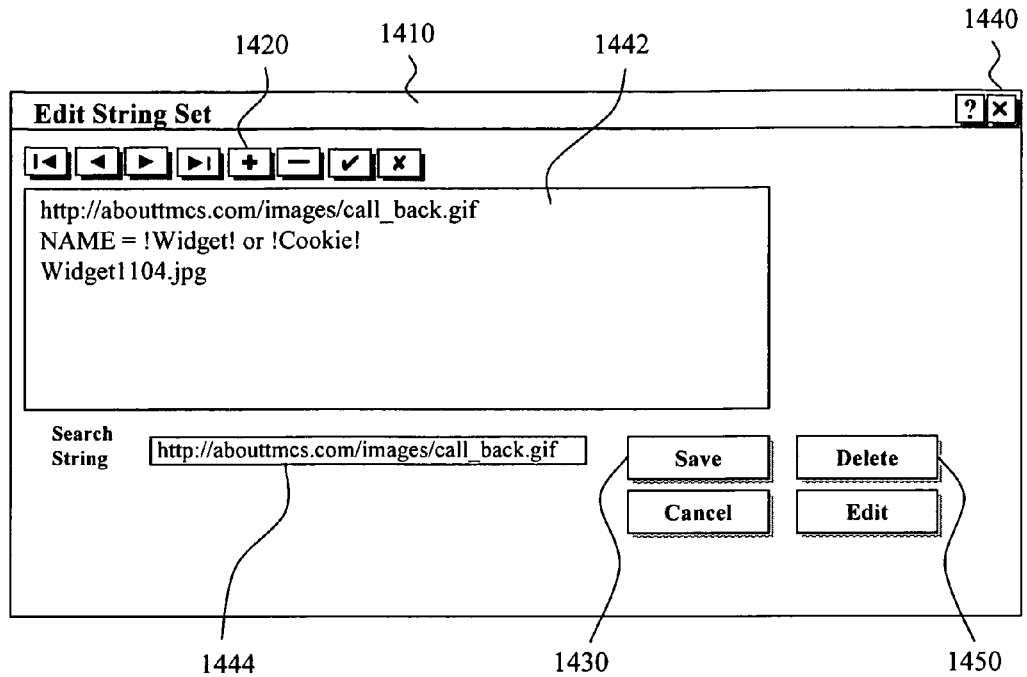
FIG. 10A is an illustrative user interface used in conjunction with the illustrative flow diagram of FIG. 5, the user interface configured to allow a user to input a search strings into a database used to store search strings for use in conjunction with a utility to automatically manage the data files.

As a user will often repeat the same search over time, searches can be stored in the search database 1620 to allow a user to replicate a common search. FIG. 5 is a flow diagram illustrating the process of inputting searches into the search database 1620, and FIG. 10A is an illustrative user interface used in conjunction with the illustrative flow diagram of FIG. 5. FIG. 10A depicts the user interface 1410 configured to allow a user to input search strings into the search database 1620.

Referring to FIGS. 5 and 10A, in step 510, the user selects either to add a new search or edit an existing search string. If the user elects to add a new search string, the user activates add new button 1420. The user is then prompted to add a new search string in step 520, and presses the save button 1430 to store the string in the search string database 1620. If the user is finished editing or adding new strings, pressing the close box 1440 will end the process, as depicted in step 540.

The user can also edit existing searches in step 510 by selecting one of the searches displayed in window 1442. FIG. 10A shows three illustrative search strings the user may edit: "http://abouttmcs.com/images/call_back.gif", which is an Internet web site; "Name=!widget! or !cookie!", which is a structured query; and "widget1104.jpg", which is a file name. Illustratively, the user has selected the search string "http://abouttmcs.com/images/call_back.gif" to edit in text edit box 1444, as depicted by step 550. The user can either edit or delete the selected string in step 560.

Should the user edit the selected string, changes are made in text edit box 1444 in accordance with step 570. Illustratively, the string "http://abouttmcs.com/images/call_back.gif" relates to an image file most likely referenced in an HTML document. Thus user can search for this document, and all related documents, by editing the string to "!tmcss!". The string is then saved to the search string database 1620 by pressing save button 1430. Prior to saving the string, however, in step 572 the computer prompts the user to either replace the unedited string with the edited string, or leave the edited string intact and add the edited string to the search database 1620, as illustrated in step 580.

Conversely, the user may elect to delete the search string by pressing delete button 1450, which deletes the search string from the search string database 1620.

Figure 11A:
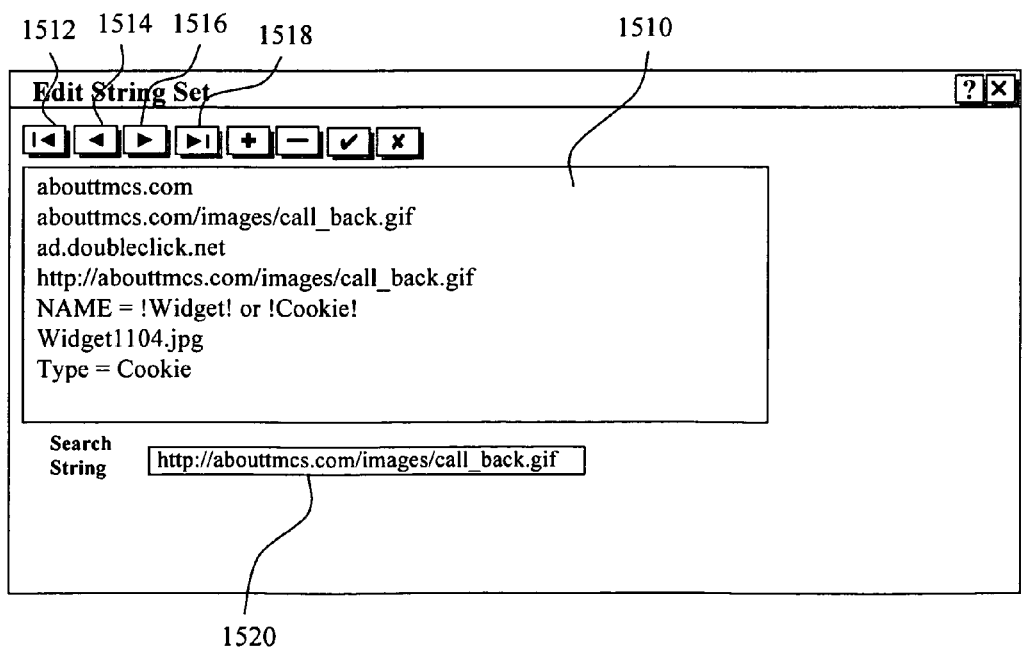
FIG. 11A is an illustrative user interface configured to allow a user to browse search strings stored in the database.

FIG. 11A is an illustrative user interface configured to allow a user to browse search strings stored in the search string database 1620. A user can select a search string by clicking on the string displayed in window 1510, or by traversing the strings in the search string database 1620 by using the first button 1512, previous button 1514, next button 1516, and last button 1518. The selected string is displayed in search string text box 1520.

Figure 6A:
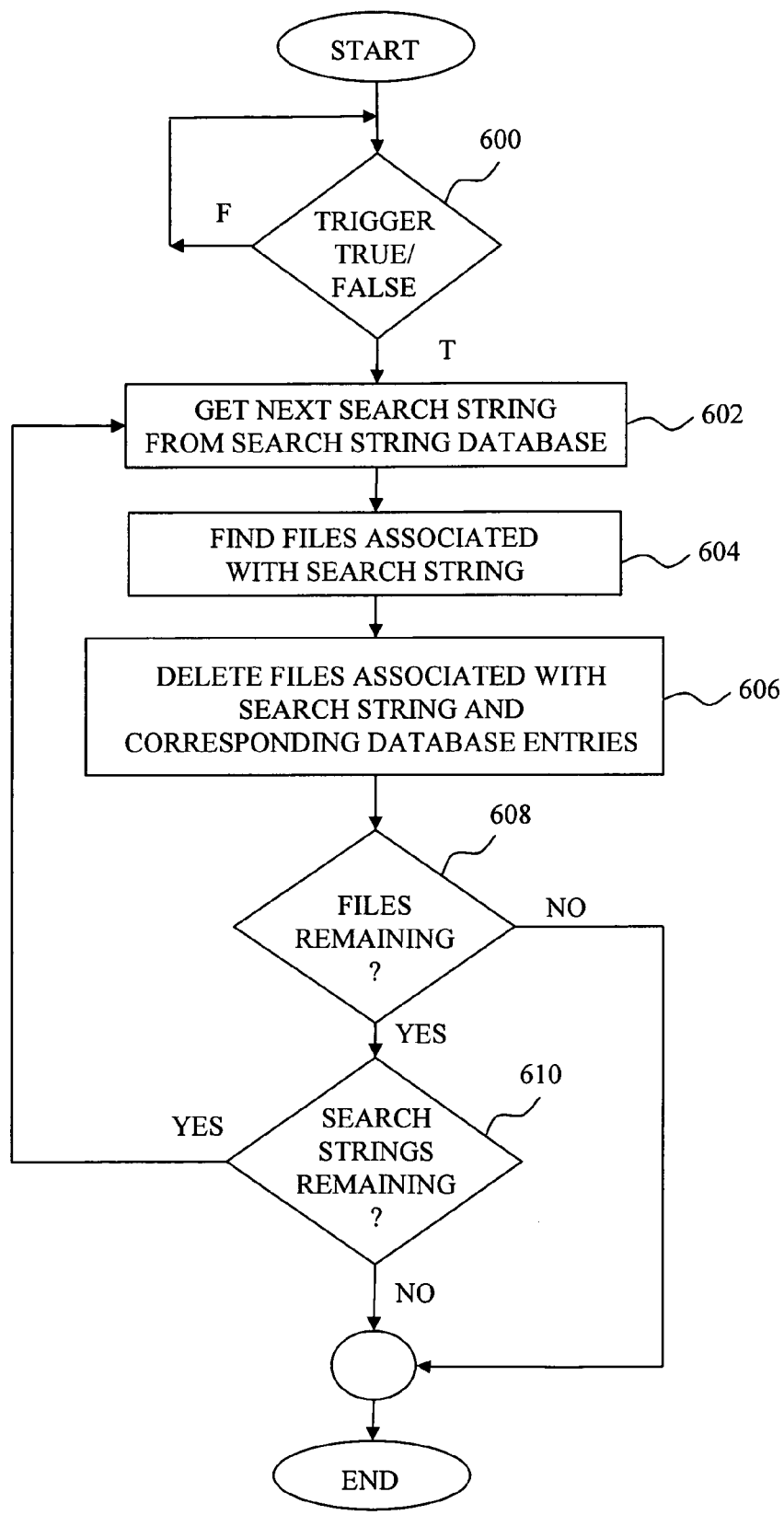
FIG. 6A is a flow diagram illustrating the utility used to automatically manage the data files by automatically deleting data files associated with the search strings stored in the database at predetermined intervals.

An exemplary embodiment of the disclosure includes a utility feature that periodically manages the Internet data files stored on the user's computer. FIG. 6A is a flow diagram illustrating the utility which is used to automatically manage the data files by automatically deleting data files associated with the search strings stored in the search string database 1620. The utility is activated by an event trigger in step 600. The event trigger can be set by launching the browser program, exiting the browser program, or a periodic event, e.g., a weekly or daily activity. The event trigger can also be set to trigger if the average access time to the cache exceeds a predefined threshold, e.g., 100 ms. The average access time is the average time for a browser to search and find requested data files in the cache. The event trigger is stored in the utility database 1650.

When the trigger event occurs, the computer retrieves the next search string from the search string database, beginning with the first string, as illustrated in step 602. Referring to FIG. 11A, the first search string selected from the search string database 1620 in step 604 is the text string "abouttmcs.com". In step 604, the cache database 1670 is searched and all data files with an address or name associated with the search string "abouttmcs.com" are identified. In step 606, all the data files associated with the search string "abouttmcs.com" are deleted, as are the corresponding database entries.

Upon deletion of the files, if no other files remain in the cache, step 608 exits the utility. Conversely, if there are data files remaining in the cache, step 610 determines if another search string is awaiting execution. If no search string is awaiting execution, the utility is terminated. However, if another search string is awaiting execution, step 602 and all subsequent steps are again executed for the next search string.

Upon completion of the utility of FIG. 6A, the user's cache is emptied of all data files that are of no interest to the user. Accordingly, access time to the cache is decreased. Furthermore, as there are now fewer data files in the cache, the user can more easily interrogate the remaining data files manually, should the user so decide.

Figure 6B:
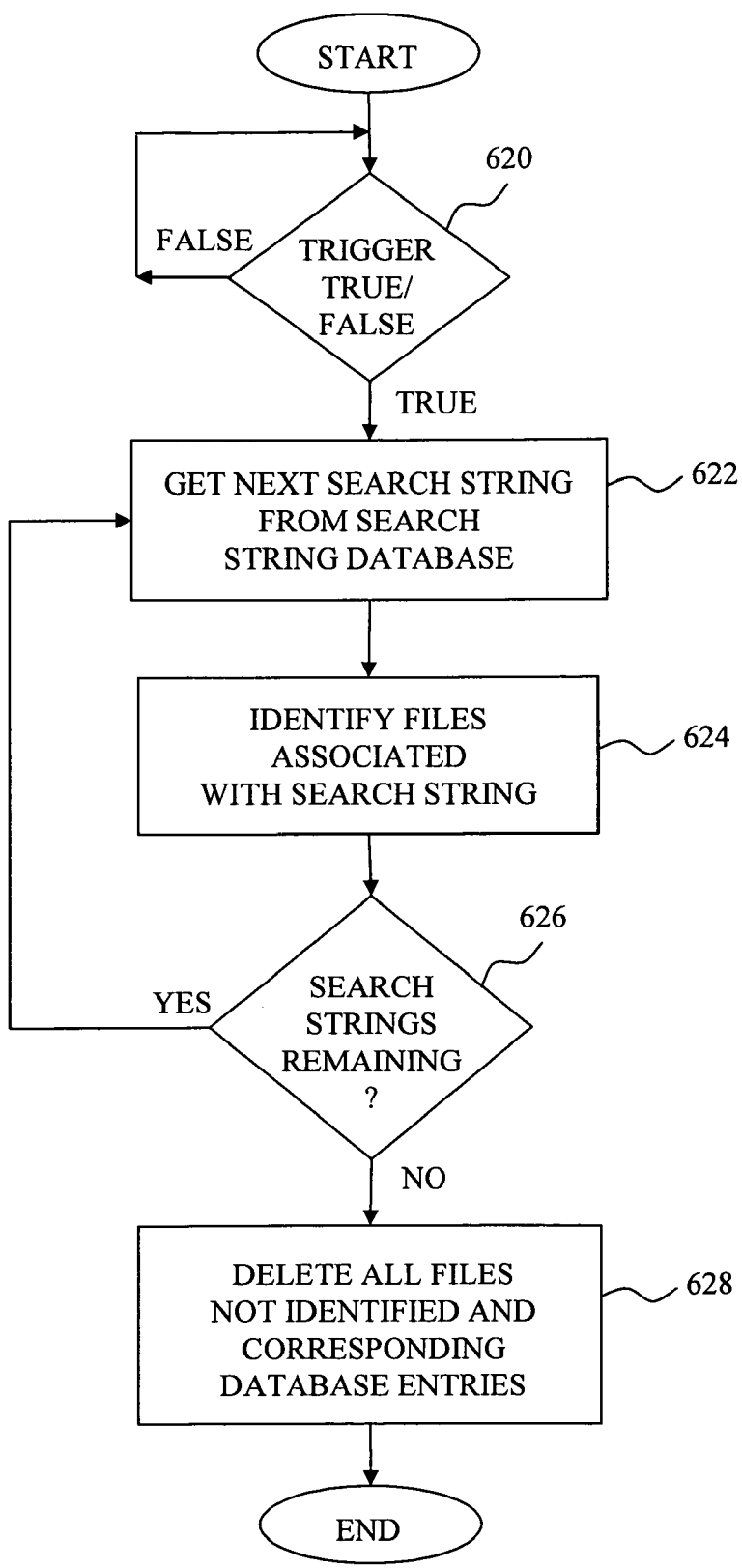
FIG. 6B is a flow diagram illustrating the utility used to automatically manage the data files by automatically saving data files associated with the search strings stored in the database at predetermined intervals.

Of course, one of ordinary skill in the art will recognize that the search strings can be used to retain data files rather than delete data files. FIG. 6B is a flow diagram illustrating a utility which is used to automatically manage the data files by automatically retaining data files associated with the search strings stored in the search string database 1620. The utility is activated by an event trigger in step 620. The event trigger can be set by launching the browser program, exiting the browser program, or a periodic event, e.g., a weekly or daily activity.

When the trigger event occurs, the computer retrieves the next search string from the search string database, beginning with the first string, as illustrated in step 622. Referring to FIG. 11A, the first search string selected from the search string database 1620 in step 622 is the text string "abouttmcs.com". In step 624, the cache database 1670 is searched and all data files with an address or name associated with the search string "abouttmcs.com" are identified. In step 626, the system determines if another search string is awaiting execution. If another search string is awaiting execution, step 622 and all subsequent steps are again executed. If no search strings remain, then all data files not identified are deleted in step 626 and the utility is terminated.

One of ordinary skill in the art will appreciate that the disclosure is not limited to the illustrative embodiments of FIGS. 6A and 6B. For example, another illustrative embodiment includes selectively determining whether each search string is a "deletion" or "retention" string. Search string database 1620 includes a field that identifies each search string as either a deletion or retention string. A deletion string is a search string that results in deletion of all data files identified in accordance with the search criteria of the search string. Conversely, a retention string is a search string that results in retention of all data files identified in accordance with the search criteria of the search string.

Figure 10B:
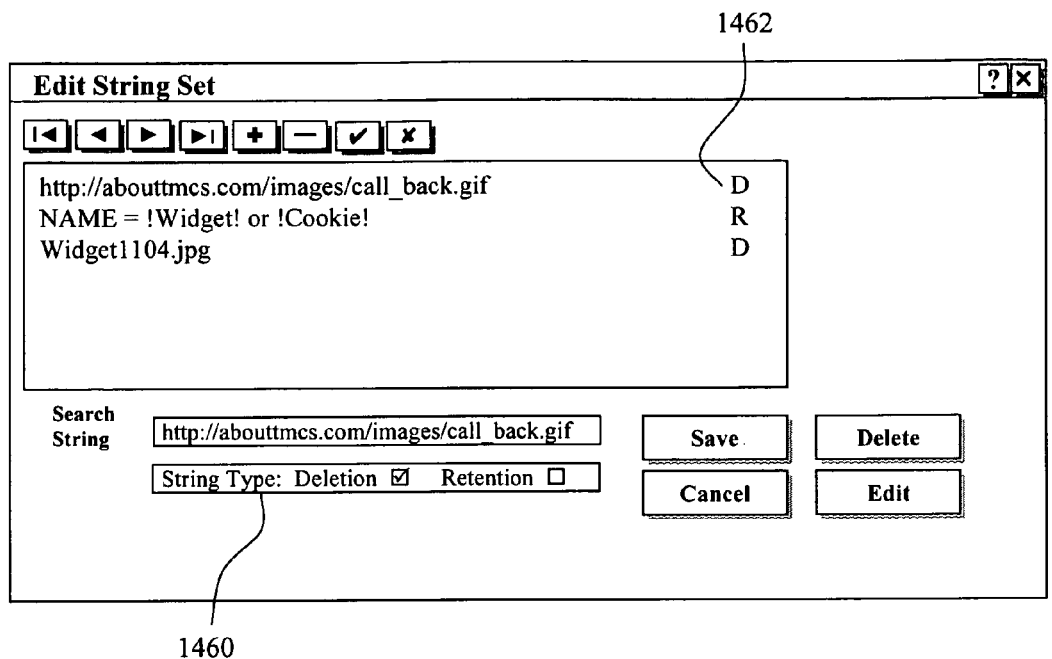
FIG. 10B is an illustrative user interface used in conjunction with the illustrative flow diagram of FIG. 5, the user interface configured to allow a user to input a search strings into a database used to store search strings for use in conjunction with a utility to automatically manage the data files, and further configured to categorize individual strings as deletion or retention strings.
Figure 11B:
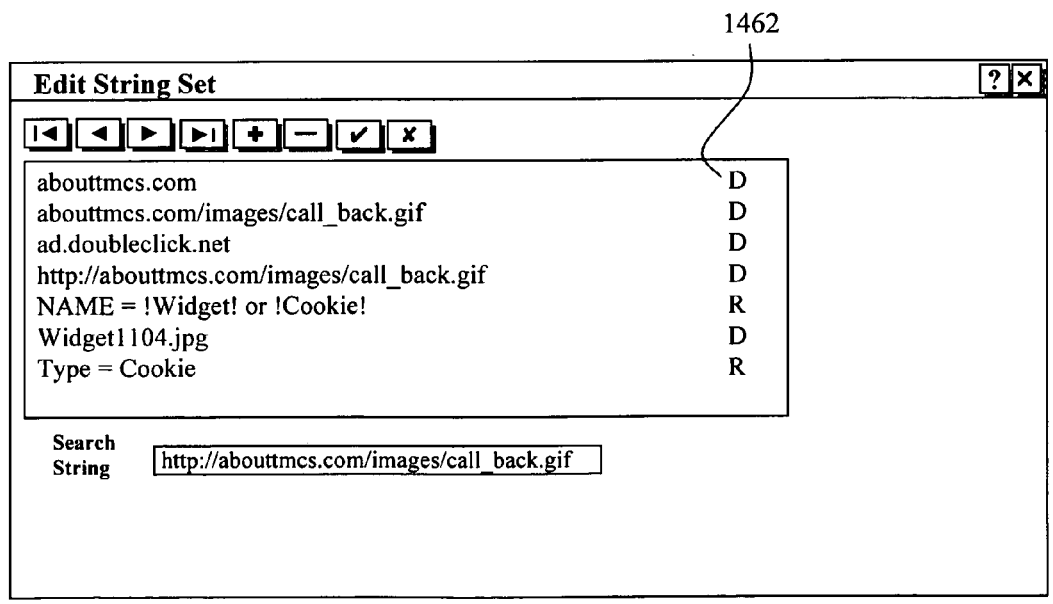
FIG. 11B is an illustrative user interface configured to allow a user to browse search strings stored in the database, and further configured to indicate whether the displayed strings are either deletion or retention strings.

FIGS. 10B and 11B are illustrative user interfaces configured to allow a user to edit and browse search strings stored in the search string database 1620. The interfaces are in all respects the same as the interfaces of FIGS. 10A and 11A, except for the referenced sections. In FIG. 10B, each search string has an associated designation letter 1462. The letter "D" represents that the associated search string is a deletion string; the letter "R" represents that the associated string is a retention string. The user determines whether the selected string is a deletion or retention string by selecting the appropriate check box in string type edit box 1460. Illustratively, the string "http://abouttmcs.com/images/call_back.gif" has been selected as a deletion string.

The user interface of FIG. 11B displays the search strings contained in the search string database 1620 in the same manner as the user interface of FIG. 11A, except for the addition of the designations letters 1462. Thus, executing a data file management utility similar to the utilities described in FIGS. 6A and 6B will result in deletion of all files corresponding to the deletion search strings and retention of all files corresponding to the retention search strings.

Figure 7A:
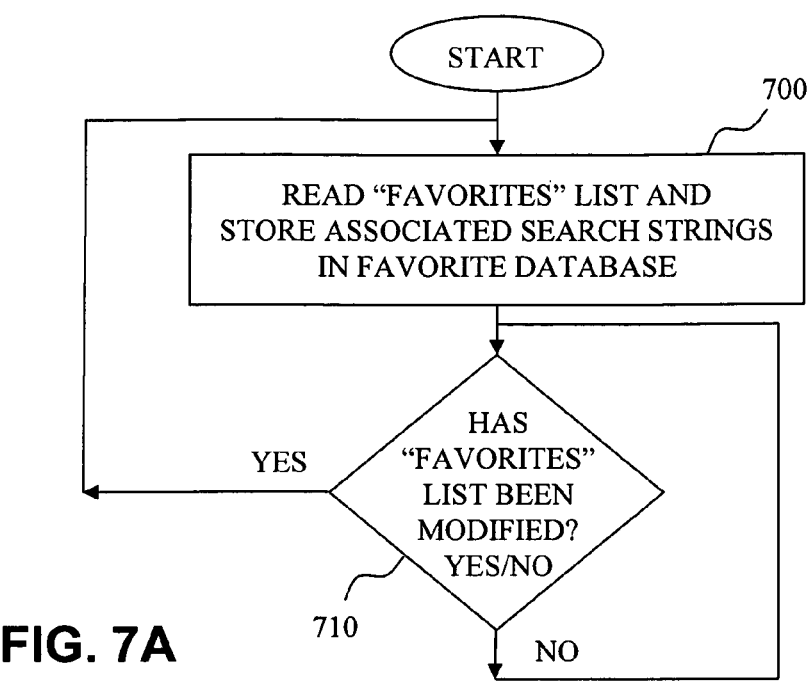
FIG. 7A is a flow diagram illustrating a utility to automatically store search strings in the database based on a user's Favorite list.

Executing the data file management utility of FIG. 6A or 6B may inadvertently result in data files associated with a user's Favorite sites being deleted, resulting in longer access times to the site as many of the data files associated with the Favorite site will need to be downloaded. As the user will most often visit sites in the favorites list, this is undesirable. These inadvertent deletions are prevented by including search strings based on the user's Favorite list, which are generated in accordance with the flow diagram of FIG. 7A, which describes a utility to automatically store search strings based on a user's Favorite list. These automated search strings are stored in the Favorite database 1630. Files associated with the search strings based on the user's Favorite list are retained.

In step 700, the user's Favorite list is read and search strings based on the Favorites list are generated and stored in the Favorite database 1630. The search strings are broad search strings that ensure that nearly all data files associated with a particular favorite site are retained. Illustratively, a Favorite site is "http://www.domain6.com/welcome.asp". The resulting broad search string is "!domain6!". Thus, files associated with cache database 1670 Name or Address fields containing the entry "domain6" will be retained. The Favorites list is then monitored in step 710. When the favorites list is updated, either by adding or deleting a Favorite site, step 700 is again executed and the Favorite database is updated accordingly by either adding or deleting the relevant search string.

Figure 7B:
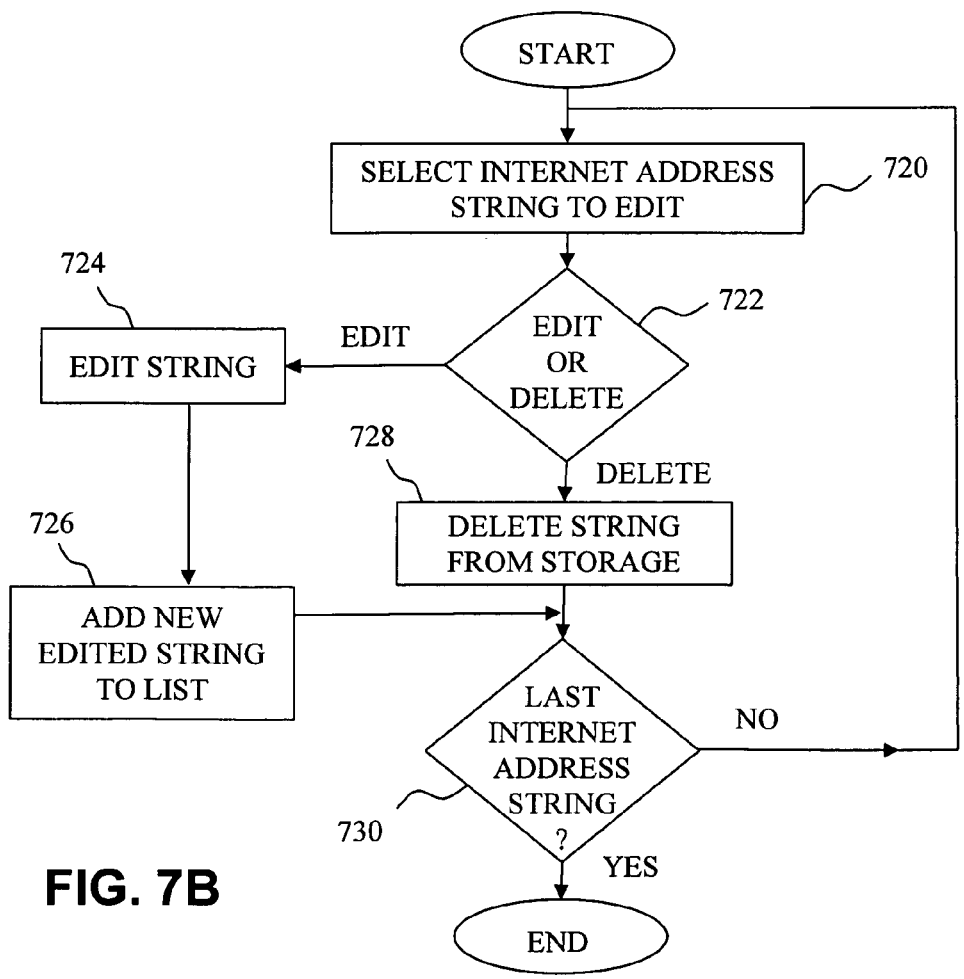
FIG. 7B is a flow diagram illustrating a utility to modify search strings obtained from the utility of FIG. 7A.

A user may not desire to retain all files associated with a Favorite site. For example, a user may desire to delete a cookie corresponding to a first Favorite site, and delete all data files corresponding to a particular product (e.g., shoes) offered for sale at a second Favorite site. FIG. 7B is a flow diagram describing a utility to modify the search strings obtained from the Favorites list during execution of the utility described in FIG. 7A. In step 720, the user selects a search string from the Favorite database 1670. In step 722, the user determines whether to edit or delete the string. If the user deletes the string in step 728, the user may either select other strings to delete or edit, or exit the utility, as shown in step 730.

Conversely, the user may edit the string in step 724 and then store the edited string in the Favorite database in step 726. Illustratively, the user can edit a first string from "!domain10!" to "!domain10! AND NOT TYPE=Cookie" to delete all cookies associated with the first Favorite site, and edit a second string from "!domain11 !" to "!domain11! AND NOT !shoe!" to delete all files associated with the shoe products offer for sale at the second favorite site.

Figure 8A:
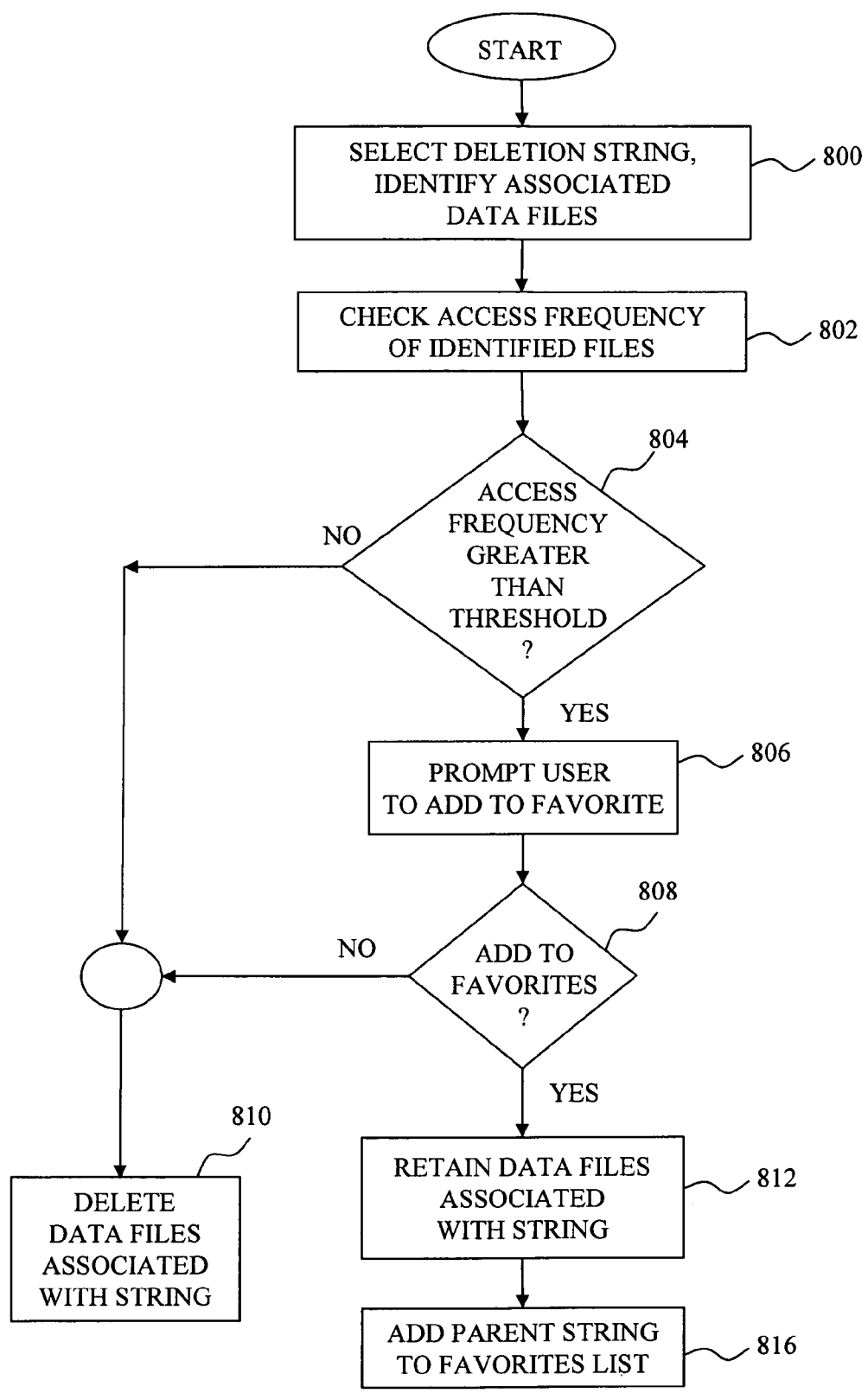
FIG. 8A is a flow diagram illustrating an alternative utility used to automatically manage the data files by automatically deleting data files not associated with the search strings stored in the database at predetermined intervals which also prompts a user to retain data files not associated with the search string if the data file has an access frequency exceeding a predetermined threshold, and based on the user's response, either deletes the data file or modifies the user's Favorite list and retains the data file.

Often a user will access an Internet site but not add the Internet site to the user's Favorite list. Thus, deletion of the data files associated with a site the user visits often is not desired, as the user will most likely visit the site again, resulting in longer access times to the site as many of the data files associated with the site will need to be downloaded. Thus, when the data files in the cache are being deleted during the execution of an automatic utility, or when the user is manually deleting data files, the process described by the flow diagram of FIG. 8A ensures that the user will not inadvertently delete data files the user often accesses. In step 800, a deletion string is selected from the search string database 1620 and files associated with that string are identified. Prior to deletion, however, the access frequency of the identified files is checked against a threshold frequency in step 804. The access frequency of each data file is stored in the frequency database 1660, and the threshold frequency is either user defined (e.g. 10 accesses per month, 10 access per week, etc.) or preset. The threshold value is stored in the utility database 1650. If the data file access frequency is less than the access frequency threshold, the data files associated with the string are deleted.

However, if the data file access frequency is greater than the access frequency threshold, the user is prompted to add the Internet site associated with the data file to the user's Favorite list in step 806. Illustratively, the Internet site will be the most common site associated with all data files identified from the search string, e.g. a parent string common to most, if not all, data files in the identified set of data files.

If the user does not add the Internet site to the Favorite list in step 808, the data files associated with the string are deleted. However, if the user decides to add the Internet site to the Favorite list, all data files associated with the string are retained in step 812, and the parent Internet address string is added to the user's Favorite list in step 816. The Favorite database 1630 is updated accordingly.

In an alternative embodiment, the user may choose to add the Internet site to a Preferred list rather than the Favorite list. A preferred database 1640 that tracks all Internet sites and associated data files corresponding to a user's preferred list. A preferred list is a list of "preferred" Internet sites that is not in the user's Favorite list. For example, a user may access an on-line movie review Internet site infrequently, perhaps on a monthly basis. The user may not desire to add the Internet site to the Favorite list for several reasons. First, adding infrequently visited Internet sites to the Favorite list will create a very large favorite list over time, and thus it will be difficult for the user to quickly find the Internet site among the large list. Additionally, the user may not want the Internet site listed in the event that another person uses the user's computer. Nevertheless, the user may access the Internet site often enough that the user desires to retain associated data files in the cache.

Figure 8B:
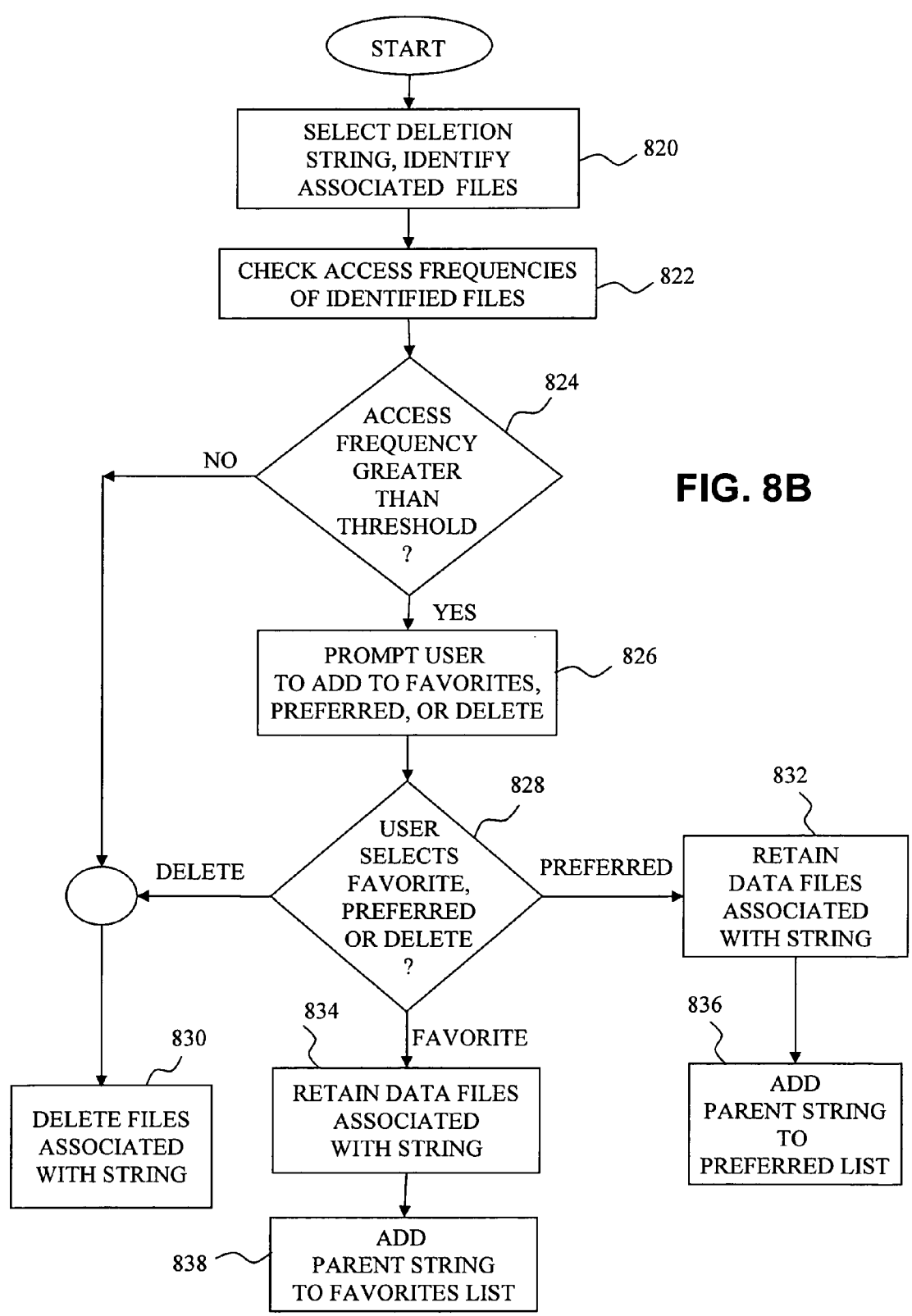
FIG. 8B is a flow diagram illustrating an alternative utility used to automatically manage the data files by automatically deleting data files not associated with the search strings stored in the database at predetermined intervals which also prompts a user to retain data files not associated with the search string if the data file has an access frequency exceeding a predetermined threshold, and based on the user's response, either deletes the data file, modifies the user's Favorite list and retains the data file, or modifies a Preferred list and retains the data file.

The process described by the flow diagram of FIG. 8B ensures that the user will not inadvertently delete data files the user often accesses, and also ensures that the user will not develop a burdensome Favorites list. In step 820, a deletion string is selected from the search string database 1620 and files associated with that string are identified. Prior to deletion, however, the access frequency of the identified files is check against a threshold frequency in step 822. If the data file access frequency is less than the access frequency threshold, the data files associated with the string are deleted.

However, if the data file access frequency is greater than the access frequency threshold, the user is prompted in step 826 to add the Internet site associated with the data file to the user's Favorite list, or add the Internet site to the user's Preferred list, or delete the associated data files. If the user decides to delete the data files in step 828, the data files associated with the string are deleted, as illustrated in step 830. However, if the user decides to add the Internet site to the Favorite list, all data files associated with the string are retained in step 834, and the parent Internet address string is added to the user's Favorite list in step 838. The Favorite database 1630 is updated accordingly.

Likewise, if the user decides to add the Internet site to the Preferred list, all data files associated with the string are retained in step 832, and the parent Internet address string is added to the user's Preferred list in step 836. The Preferred database 1640 is updated accordingly.

Figure 8C:
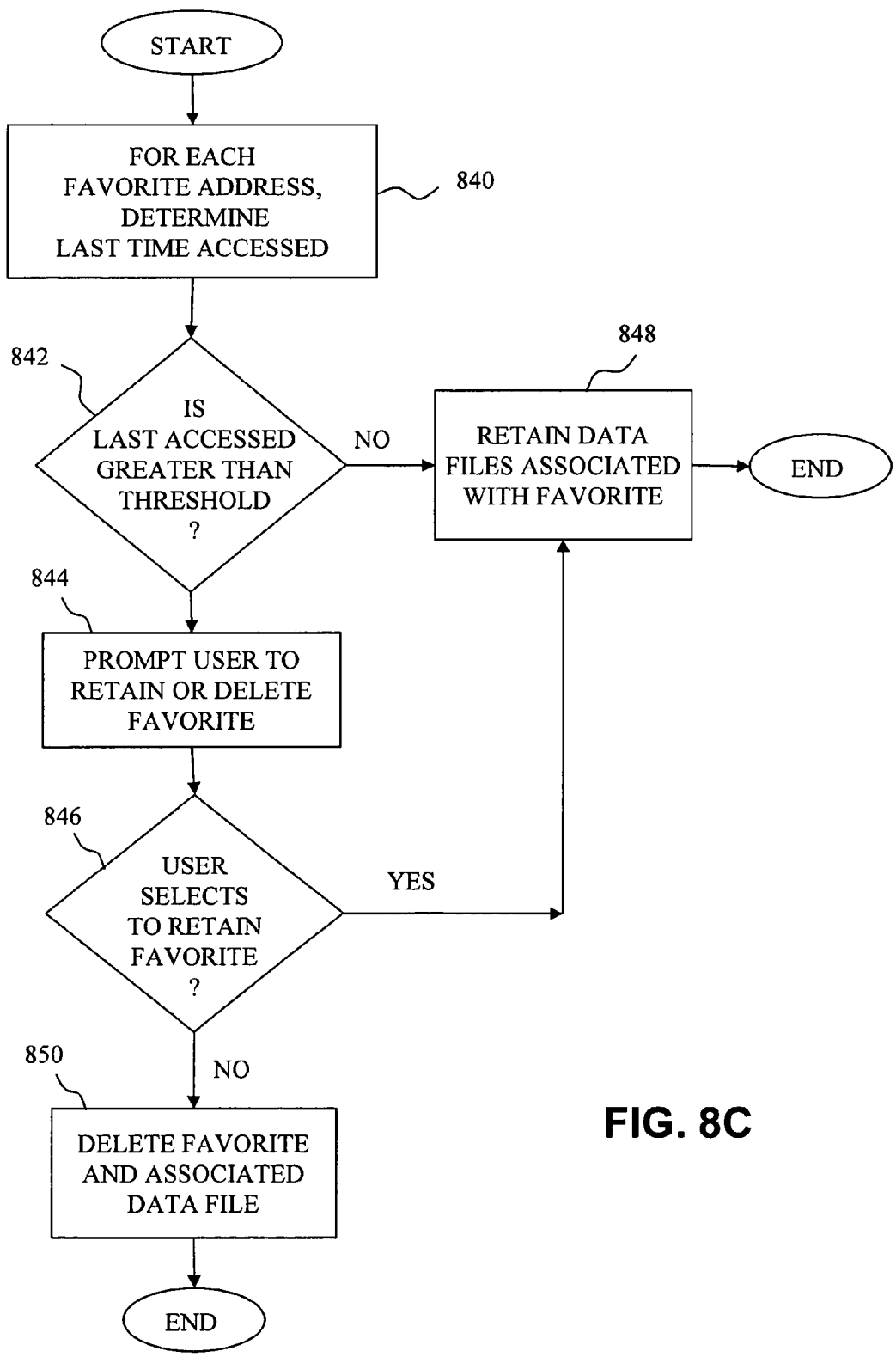
FIG. 8C is a flow diagram illustrating an alternative utility used to automatically manage the data files by prompting a user to modify the user's Favorite list if the data files associated with a particular Favorite Internet site have not been accessed for a predetermined period of time, and based on the user's response will either retain the data files or delete the Favorite Internet site from the user's Favorite list and delete the associated data files.

Another illustrative embodiment includes a utility used to automatically manage the data files by prompting a user to modify the user's Favorite list if the data files associated with a particular Favorite Internet site have not been accessed for a predetermined period of time. Based on the user's response, the utility will either retain the data files or delete the Favorite Internet site from the user's Favorite list and delete the associated data files. This process is described with reference to FIG. 8C.

In step 840, the utility interrogates the user's Favorites list and determines when the last time a favorite site was accessed. If the favorite site has been accessed more recently than a threshold date as defined in step 842, then that Favorite site and all data files associated with that favorite site are retained in step 848. Illustratively, the threshold date can be a user defined date, e.g., 3 months earlier, 6 months earlier, etc., or can be a preset value. This threshold date is stored in the utility database 1650.

If the favorite site has not been accessed after the threshold date, then the user is prompted in step 844 to retain or delete the Favorite site from the Favorite list. If the user decides to keep the Favorite site in the user's Favorite list in step 846, then that Favorite site and all data files associated with that favorite site are retained in step 848. However, if the user decides to delete the Favorite site from the Favorites list, then the Favorite site is deleted from the Favorite list in step 848, and all associated data files are likewise deletes in step 850. The Favorite database 1630 is updated accordingly.

Of course, one or ordinary skill in the art will readily appreciate that a user's preferred list can be managed in the same manner as the user's Favorite list as described above.

Figure 9A:
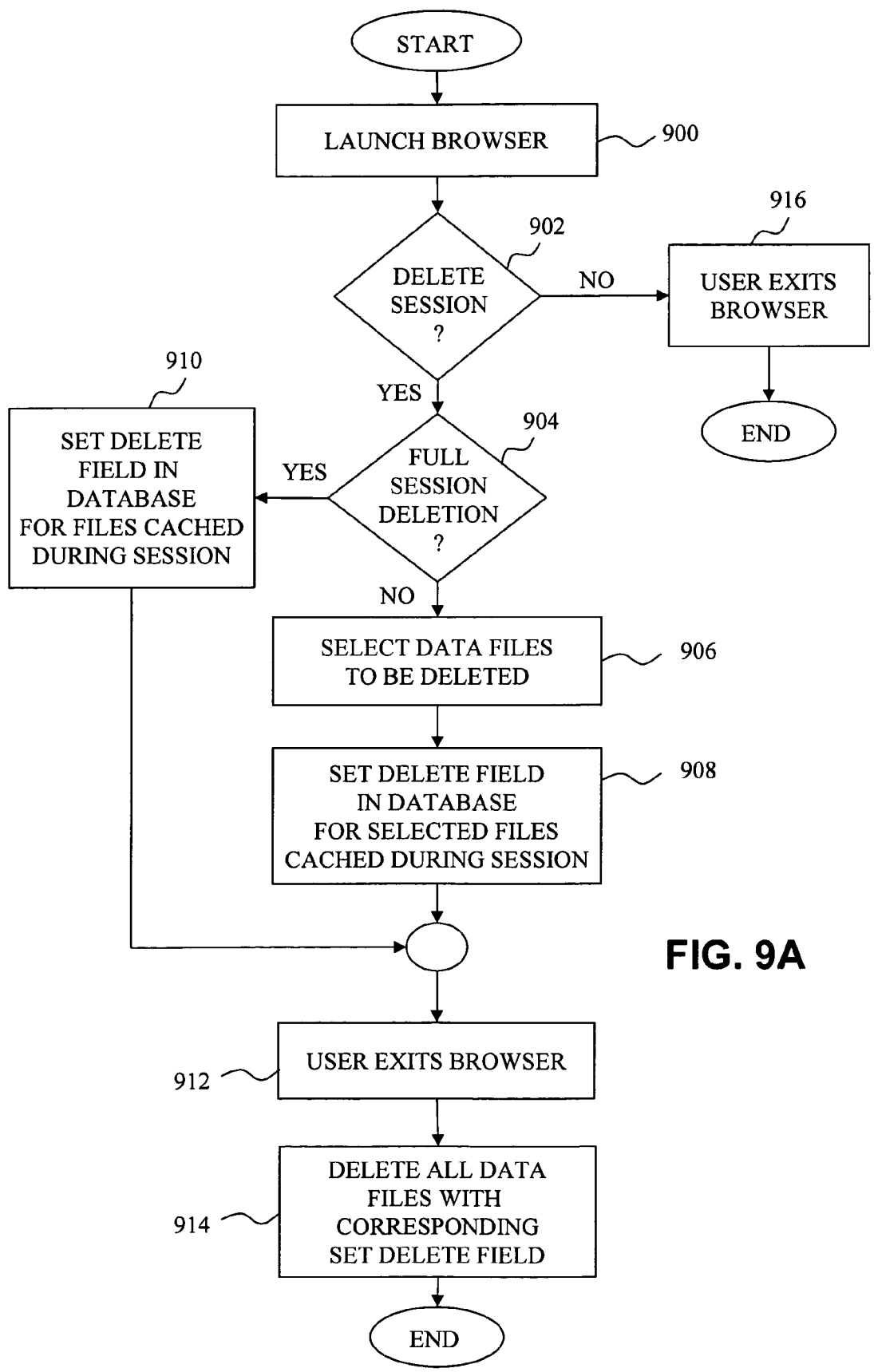
FIG. 9A is a flow diagram illustrating a utility used to delete all data files stored during a browsing session, or delete only selected data files stored during a session.

In an alternative embodiment of the disclosure, a user can delete all data files stored during a browsing session while retaining all previously stored data files. FIG. 9A depicts a flow diagram illustrating a utility used to delete all data files stored during a browsing session. Additionally, the user can specify that only selected data files stored during a session be deleted.

For each browsing session, information relating to all Internet sites and associated data files accessed during the current browsing session are stored in the current session database 1610. Thus, from the time a user launches a web browser and begins accessing Internet sites, a database of all data files accessed during that session is created. The current session database 1610 fields are the Name, Address, Type, Last Accessed, Last Modified, Last Checked, Expires, and Delete fields. A browsing session begins when the browser is launched in step 900. Step 902 determines whether the data files stored during the session will be deleted. If the user elects not to delete the session, the browsing session proceeds and none of the data files are deleted after the user exits the browser in step 916.

If the user elects to delete the session, step 904 determines whether all the data files stored during the session will be deleted or if only selected data files will be deleted. If all data files are to be deleted, information corresponding to all data files stored during the session will be input into the current session database 1610, and all delete fields for each entry are by default set to a true value in step 910. When the user exits the browsing session in step 912, the current session database 1610 is searched by the delete field and all data files for which the delete field is true are deleted.

If only selected data files are to be deleted after the session, the user selects data files in step 906. Illustratively, a user may desire to keep all data files stored during a session except for cookies. One method of accomplishing this is to suppress acceptance of cookies in the browser program. However, suppressing acceptance of cookies may cause errors when browsing web pages, or relevant information the user inputs into a web page may not be displayed. Thus, rather than suppressing cookies, the user desires that cookies be automatically accepted by the browser during the session. The cookies are then stored in the user's cache.

To avoid deleting each individual resulting cookie after the browsing session, the user can select from a drop down menu to delete cookie files, or can input a structured query indicating the same. In step 908, the delete fields corresponding to the selected data files to be deleted are set to true in the current session database 1610, and the delete field corresponding to all other files is false. When the user exits the browsing session in step 912, the current session database 1610 is searched by the delete field and all data files for which the delete field is true are deleted in step 914. Thus, in the example above, only the cookies stored during the user's current browsing session are deleted, and all other cookies stored prior to the browsing session are retained.

Figure 9B:
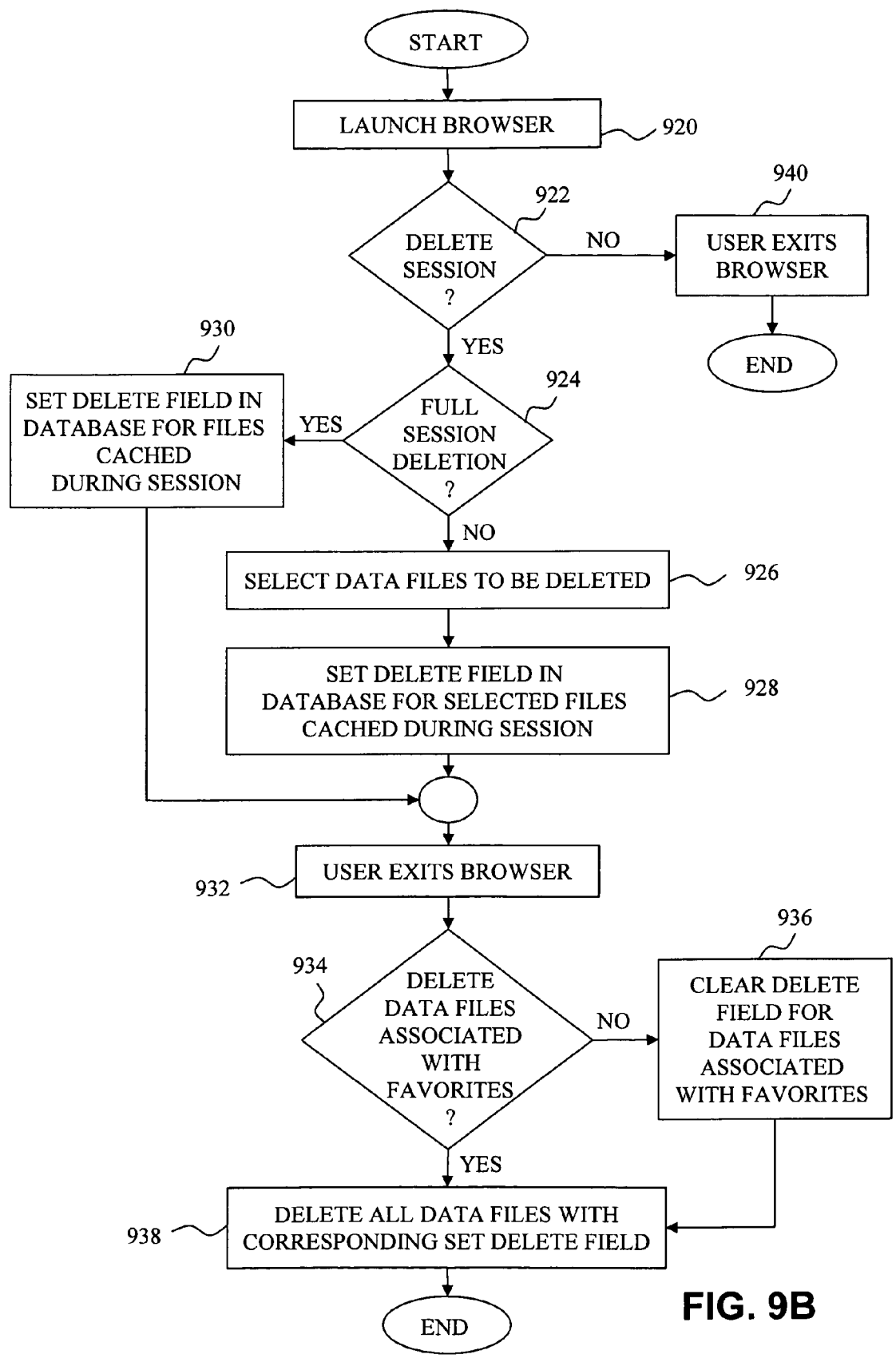
FIG. 9B is a flow diagram illustrating an alternative utility used to delete all data files stored during a browsing session, or delete only selected data files stored during a session, and which prompts a user to confirm deletion of data files stored during a session if the data files are associated with a Favorite Internet site stored in the user's Favorite list.

In another alternative embodiment of the disclosure, a user can delete all data files stored during a browsing session while retaining all previously stored data files, and also retain all data files stored during the browsing session associated with Internet sites from the user's Favorite list. FIG. 9B is a flow diagram illustrating an alternative utility used to delete all data files stored during a browsing session, or delete only selected data files stored during a session, and which prompts a user to confirm deletion of data files stored during a session if the data files are associated with a Favorite Internet site stored in the user's Favorite list.

Steps 920, 922, 924, 926, 928, 930, 932 and 940 of FIG. 9B are similar to steps 900, 902, 904, 906, 908, 910, 912 and 916, respectively, of FIG. 9A. However, prior to deleting data files stored during the browsing session, step 934 prompts the user to confirm deletion of data files stored during a session if the data files are associated with a Favorite Internet site stored in the user's Favorite list. If the user confirms deletion, all data files for which the delete field is true in the current session database 1610 are deleted in step 938. If the user elects to retain the data files stored during a session if the data files are associated with a Favorite Internet site stored in the user's Favorite list, the delete fields corresponding to those data fields are changed from "True" to "False" before execution of step 938.

Of course, one or ordinary skill in the art will readily appreciate that a user's preferred list can be managed in the same manner as the user's Favorite list as described above.

Figure 13:
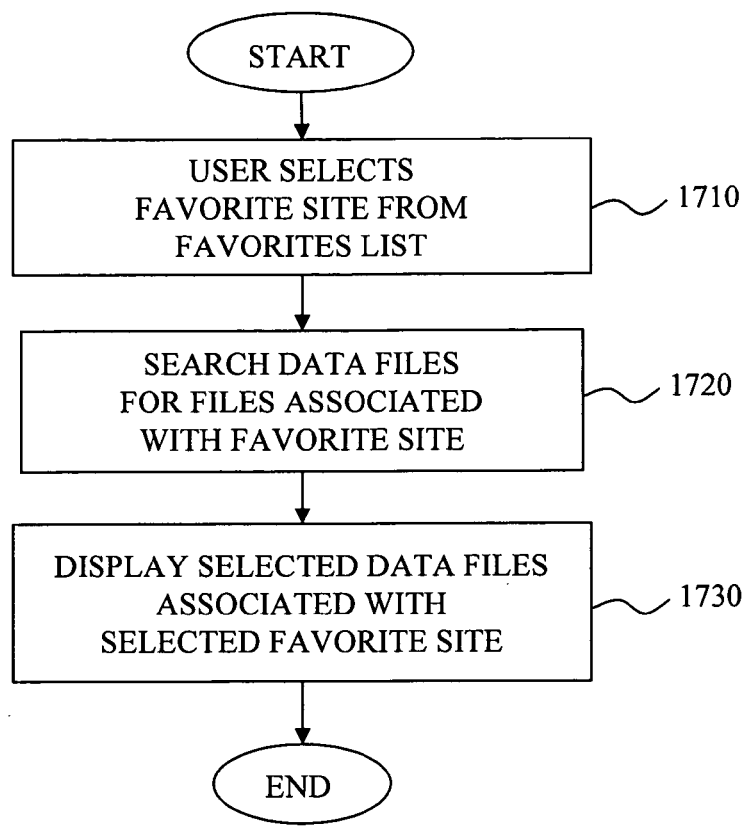
FIG. 13 is a flow diagram in describing the process of searching the storage directory for files associated with a Favorite Internet site stored in the Favorites list.

Another exemplary embodiment of the disclosure searches the cache for data files associated with a favorite Internet site stored in the Favorites list, and allows the user to browse all stored data files associated with the search string. As shown in FIG. 13, a user selects a Favorite site from the user's Favorite list in step 1710. In step 1720, a search string is created from the Favorite site and all data files associated with the Favorite site are identified and displayed in step 1730. FIG. 14 provides illustrative search results based on a user's Favorite site (e.g., a web page entitled "Widgets from Domain1.com").

FIG. 15 is an illustrative user interface associated with another alternative embodiment of the disclosure that searches the cache for data files associated with a favorite Internet site stored in the Favorites list, and allows the user to browse all stored data files associated with the search string. Additionally, the user can selectively delete each data file by selecting delete boxes 1520–1570, or the user can delete all associated files by selecting the macro delete box 1510.

Figure 12:
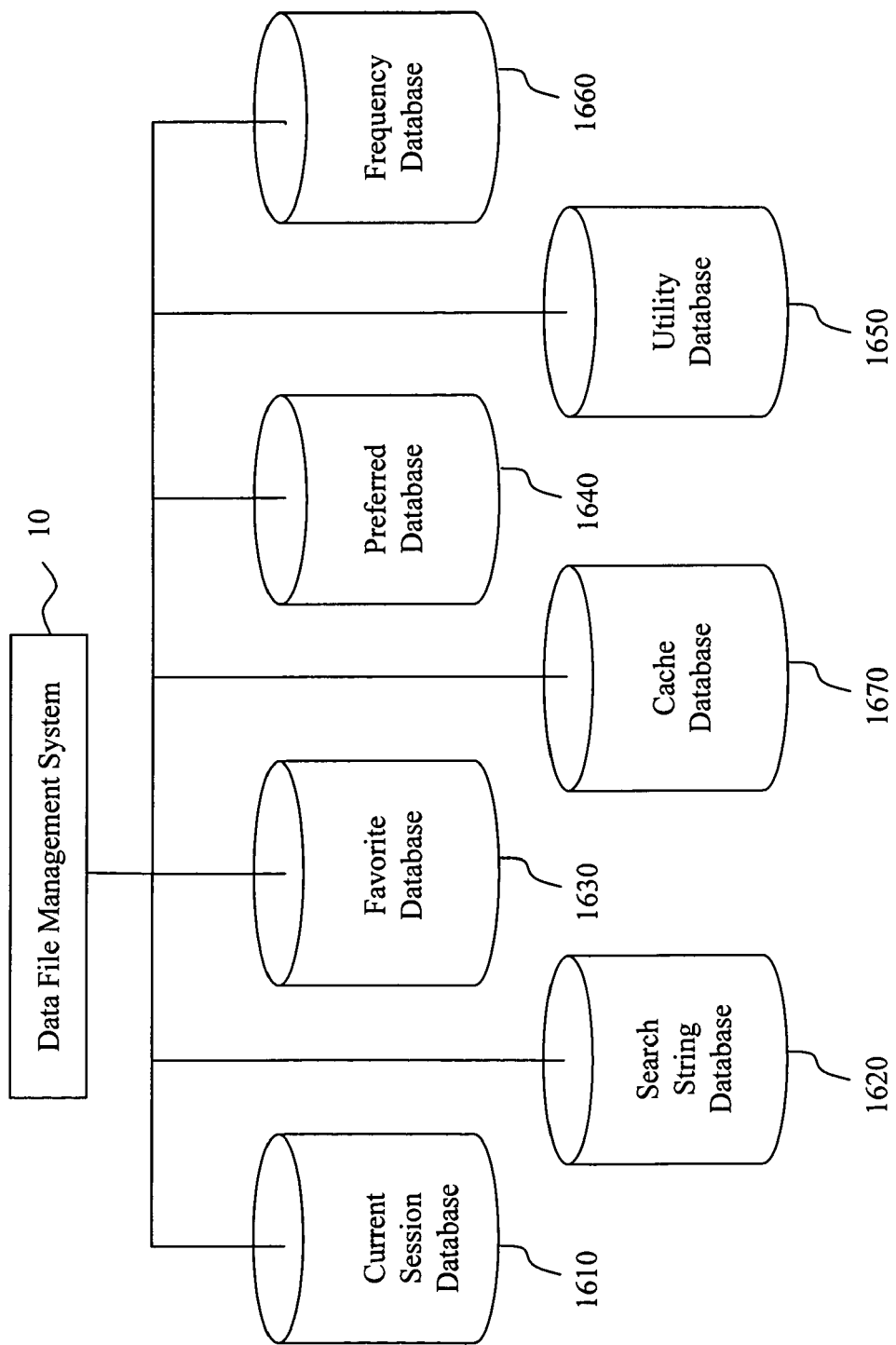
FIG. 12 is a illustrative database used in the data file management system, the database including a current session database, a search string database, a favorite database, a cache database, a preferred database, a utility database, and a frequency database.
Figure 16:
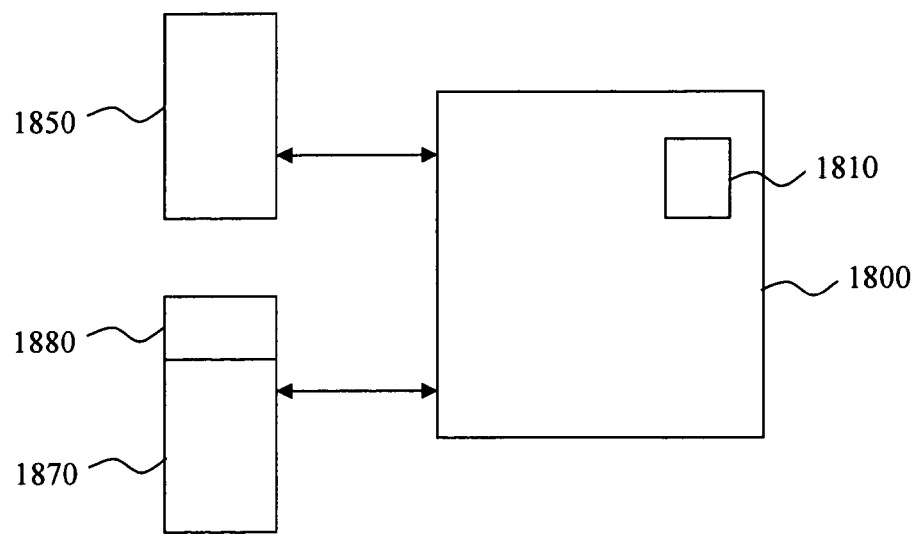
FIG. 16 is a block diagram of an alternative embodiment, depicting a utility program running in concert with a web browsing program to manage data files stored in a storage area, the management based on a network address list.

Exemplary embodiments have been described above with reference to the database structure of FIG. 12. Of course, one of ordinary skill in the art will appreciate that the embodiments need not implement a database structure, and can be implement by storing much of the search string data, associated data file data (i.e., access frequency, type, etc.) and network address information in indexed or non-indexed flat files. As shown in FIG. 16, a computer 1800 accesses a list of network addresses 1850 and a storage medium 1870 in which is stored data files in storage area 1880. Program 1810 is executed on the computer 1800, and the program is configured to delete data files not associated with first list of network addresses. The list of network addresses 1850 is a text file containing the network addresses, sorted alphanumerically. Alternatively, the list of network addresses is a user's favorite list, and is illustratively a collection of HTML documents accessible by the user's web browsing program. Illustratively, storage area 1880 is a hard drive connected to computer 1800, and storage area 1880 is the cache directory associated with user's web browser. Program 1810 is a utility program running in concert with the user's web browser software. Computer 1800 and program 1810 can be programmed to implement the algorithms depicted in the flow diagrams previously described, utilizing an indexed or non-indexed flat file data format.

Although the invention has been described in detail with reference to certain preferred embodiments, variations and modifications exist within the scope and spirit of the invention as described and defined in the following claims.

What is claimed is:

1. A system for managing a plurality of data files for a web browser, the system comprising:
    a storage area on a computer storage medium, the storage area storing the data files;
    a computer configured to access the storage area;
    a first database configured to index the data files stored in the storage area; and
    a program executable on the computer and configured to generate at least one automated search string, the program further configured to search the database index according to the automated search string and identify data files associated with the automated search string and to remove at least one data file from the storage area based on those data files identified from the search string.

2. The system of claim 1, further comprising:
    a second database configured to index data files stored in the storage area corresponding to a network site the user has grouped in a first list.

3. The system of claim 2, wherein the program is further configured to generate at least one automated search string corresponding to the data files indexed by the second database.

4. The system of claim 1, wherein the program is further configured to search the first database index upon an activation of an event.

5. The system of claim 4, wherein the event is activated when the web browser average access time to access the data files in the storage area exceeds a threshold time.

6. The system of claim 4, wherein the event is activated when the web browser is launched.

7. The system of claim 5, wherein the program is further configured to delete all identified data files.

8. The system of claim 3, wherein the program is further configured to search the first and second databases upon an activation of an event.

9. The system of claim 8, wherein the event is activated when the web browser average access time to data files in the storage area exceeds a threshold time.

10. The system of claim 8, wherein the program is further configured to delete all data files not identified from the search.

11. The system of claim 3, further comprising a third database configured to store access frequencies corresponding to stored data files.

12. The system of claim 11, wherein the program is further configured to search the first, second, and third databases upon an activation of an event.

13. The system of claim 12, wherein the program is further configured to delete all data files identified during the search.

14. The system of claim 12, wherein the program is further configured to retain a data file identified during the search if the data file has an associated access frequency that exceeds a predetermined reference value.

15. The system of claim 14, wherein the program is further configured to index in the third database the data file having an associated access frequency that exceeds a predetermine reference value.

16. The system of claim 14, where the program is further configured to retain a data file identified during the search if the data file corresponds to a stored file indexed by the third database.

17. The system of claim 2, further comprising a third database, the third database configured to store a user-defined search string and the automated search string.

18. The system of claim 17, wherein the third database indexes the search strings by a type key, the type key having a first value corresponding to a retention value, and a second value corresponding to a deletion value.

19. The system of claim 18, wherein the program is further configured to retain data files identified by a search using a search string indexed by the retention value, and delete data files identified by a search using a search string indexed by a deletion value.

20. The system of claim 11, wherein the program is further configured to delete a data file if the data file has an associated access frequency that is lower than a predetermined reference value.

21. The system of claim 20, wherein the system is further configured to remove from the first list the network site corresponding to the data file having an associated access frequency that falls below a predetermine reference value.

22. The system of claim 21, wherein the program is further configured to remove the index in the third database corresponding to the data file having an associated access frequency that falls below a predetermine reference value.

23. A system for managing stored data files for a web browser, the system comprising:
    a storage area on a computer storage medium, the storage area storing the data files;
    a computer configured to access the storage area;
    a database configured to index data files stored in the storage area during a single browsing session; and
    a program executable on the computer configured to search the database and identify data files stored in the storage area and indexed by the database, the program being configured to delete data files indexed in the database upon terminating the single browsing session.

24. The system of claim 23 wherein the program is further configured to identify by a user-defined criteria data files indexed in the database and to retain identified data files indexed in the database upon exiting the browsing session.

25. A method for managing a plurality of data files stored in a storage area for a web browser, the method comprising the steps of:
    indexing the stored data files in a database to provide a database index;
    generating automated search strings based on the stored data files in the storage area;
    searching the database according to the automated search strings;
    identifying data files associated with the automated search strings; and
    removing at least one data file from the storage area based on those data files identified from the search.

26. The method of claim 25, wherein the step of searching the database according to the automated search strings includes the steps of:
defining a search event; and
initiating the search according to the automated search strings after the occurrence of the event.

27. The method of claim 26, further including the step of deleting all data files identified from the search.

28. The method of claim 26, further including the step of deleting all data files not identified from the search.

29. The method of claim 25, further comprising the steps of:
determining an access frequency for a data file stored in the storage area; and
retaining the data file if the corresponding access frequency is above a threshold value.

30. The method of claim 25, further comprising the steps of:
determining an access frequency for a data file stored in the storage area; and
deleting the data file if the corresponding access frequency is below a threshold value.

31. The method of claim 25, wherein the step of generating automated search strings comprises the steps of:
identifying all data files corresponding to a common network address; and
using the common network address as a search term.

32. A system for managing a plurality of data files for a web browser, the system comprising:
a computer storage medium;
a computer configured to access the storage medium;
a first list of network addresses stored on the computer storage medium;
a storage area on the computer storage medium, the storage area storing the data files; and
a program executable on the computer, the program configured to identify data files associated with the first list of network addresses and delete data files not associated with the first list of network addresses.

33. The system of claim 32, wherein the program is further configured to determine an access frequency associated with a data file and modify the first list of network addresses based on the access frequency of the data file.

34. The system of claim 33, wherein the program modifies the first list of network addresses by deleting the network address corresponding to the data file if the associated access frequency is less than a threshold value.

35. The system of claim 33, wherein the program modifies the first list of network addresses by adding the network address corresponding to the data file if the associated access frequency is greater than a threshold value.

36. The system of claim 32, wherein the program is further configured to determine an access time associated with the computer accessing the storage area, and further configured to delete data files in the storage area if the access time exceeds a threshold value.

37. The system of claim 32, further comprising:
a second list of network addresses; and
wherein the program is further configured to store in the second list of network addresses network addresses associated with data files that are stored in the storage area during a browsing session.

38. The system of claim 37, wherein the program is further configured to delete data files associated with the second list of network addresses after termination of the browsing session.

39. The system of claim 38, wherein the program is further configured to determine an access time associated with the computer accessing the storage area, and further configured to delete data files in the storage area if the access time exceeds a threshold value.

40. A system for managing a plurality of data files for a web browser, the system comprising:
a computer storage medium;
a computer configured to access the storage medium,
a list of network addresses stored on the computer storage medium, each network address in the list of network address corresponding to at least one data file,
a storage area on the computer storage medium, the storage area storing the data files; and
a program executable on the computer, the program configured to determine an access frequency associated with one of the data files and modify the list of network addresses based on the access frequency of the data file, and wherein the program modifies the list of network addresses by deleting the network addresses corresponding to the data file with an associated access frequency less than a threshold value.

41. A system for managing a plurality of data files for a web browser, the system comprising:
a computer storage medium;
computer configured to access the storage medium;
a list of network addresses stored on the computer storage medium, each network address in the list of network address corresponding to at least one data file;
a storage area on the computer storage medium, the storage area storing the data files; and
a program executable on the computer, the program configured to determine an access frequency associated with one of the data files and modify the list of network addresses based on the access frequency of the data file, wherein the program modifies the list of network addresses by adding the network addresses corresponding to the data file with an associated access frequency greater than a threshold value.

42. A system for managing a plurality of data files for a web browser, the system comprising:
a storage area on a computer storage medium, the storage area storing the data files;
a computer configured to access the storage area; and
a program executable on the computer, the program configured to determine an access time associated with the computer accessing storage area, and further configured to delete data files in the storage area if the access time exceeds a threshold value.

43. The system of claim 42, further comprising:
a list of network addresses; and
wherein the program is further configured to retain data files in the storage area associated with the list of network addresses.

44. A method of managing a plurality of data files for a web browser, the method comprising the steps of:
storing the data files on a computer storage medium;
creating a first list of network addresses;
storing the first list of network addresses on the computer storage medium; and
deleting from the computer storage medium data files not associated with the first list of network addresses.

45. The method of claim 44, further comprising:
determining an access frequency associated with one of the data files; and
modifying the first list of network addresses based on the access frequency of the data file.

46. The method of claim 45, wherein the step of modifying the first list of network addresses based on the access frequency of the data file comprises the step of deleting from the first list of network addresses the network address corresponding to the data file with an associated access frequency less than a threshold value.

47. The method of claim 46, wherein the step of modifying the first list of network addresses based on the access frequency of the data file comprises the step of adding to the first list of network addresses the network address corresponding to the data file with an associated access frequency greater than a threshold value.

48. The method of claim 47, further comprising the steps of:
  determining an access time associated with accessing the data files; and
  deleting data files if the access time exceeds a threshold value.

49. The method of claim 45, further comprising the steps of:
  determining an access time associated with accessing the data files; and
  deleting data files if the access time exceeds a threshold value.

50. The method of claim 44, further comprising the steps of:
  creating a second list of network addresses;
  storing the second list of network addresses on the computer storage medium;
  adding to the second list of network addresses network addresses accessed during a browsing session;
  storing corresponding data files corresponding to the second list of network addresses; and
  deleting the corresponding data files corresponding with the second list of network addresses after the browsing session is terminated.

51. The method of claim 50, further including the step of retaining corresponding data files corresponding with the second list of network addresses if the corresponding data files also correspond to the first list of network addresses.

52. The system of claim 1, wherein the program is further configured to delete all identified data files.

53. The system of claim 1, wherein the program is further configured to delete all data files not identified from the search.

54. The system of claim 1, wherein the program is further configured to selectively remove the at least one data file based on a user input.

* * * * *